(12) United States Patent
Jung

(10) Patent No.: US 8,260,001 B2
(45) Date of Patent: Sep. 4, 2012

(54) METHOD AND SYSTEM FOR RECOGNIZING TARGET PARKING LOCATION OF VEHICLE BY DETECTING RANGE DATA

(75) Inventor: Ho-gi Jung, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 932 days.

(21) Appl. No.: 12/288,928

(22) Filed: Oct. 24, 2008

(65) Prior Publication Data
US 2009/0146842 A1    Jun. 11, 2009

(30) Foreign Application Priority Data
Oct. 26, 2007    (KR) .................. 10-2007-0108342

(51) Int. Cl.
*G06K 9/00* (2006.01)
*B60Q 1/48* (2006.01)
(52) U.S. Cl. ............................ 382/104; 340/932.2
(58) Field of Classification Search .......... None
See application file for complete search history.

(56) References Cited

U.S. PATENT DOCUMENTS

| | | | |
|---|---|---|---|
| 5,809,161 A * | 9/1998 | Auty et al. | 382/104 |
| 7,373,012 B2 * | 5/2008 | Avidan et al. | 382/260 |
| 2004/0019425 A1 * | 1/2004 | Zorka et al. | 701/301 |
| 2005/0267657 A1 * | 12/2005 | Devdhar | 701/35 |
| 2006/0078161 A1 * | 4/2006 | Schmiegel et al. | 382/103 |
| 2006/0171594 A1 * | 8/2006 | Avidan et al. | 382/224 |
| 2006/0280249 A1 * | 12/2006 | Poon | 375/240.16 |
| 2007/0282499 A1 * | 12/2007 | Maeda et al. | 701/41 |
| 2007/0286526 A1 * | 12/2007 | Abousleman et al. | 382/284 |
| 2007/0288876 A1 * | 12/2007 | Irmatov et al. | 716/7 |
| 2008/0059069 A1 * | 3/2008 | Trutna | 701/301 |
| 2008/0219556 A1 * | 9/2008 | Han et al. | 382/185 |
| 2009/0121899 A1 * | 5/2009 | Kakinami et al. | 340/932.2 |
| 2009/0146842 A1 * | 6/2009 | Jung | 340/932.2 |
| 2010/0045448 A1 * | 2/2010 | Kakinami | 340/435 |
| 2010/0259420 A1 * | 10/2010 | Von Reyher et al. | 340/932.2 |

FOREIGN PATENT DOCUMENTS
WO    WO 2007/000868 A1 *    4/2007

* cited by examiner

*Primary Examiner* — Brian P Werner
*Assistant Examiner* — Tahmina Ansari
(74) *Attorney, Agent, or Firm* — McDermott Will & Emery LLP

(57) ABSTRACT

Disclosed is a method and a system for recognizing a target parking location of a vehicle. The system includes a scanning laser radar for detecting range data reflected and directed from a rear surface of the vehicle; a preprocessing unit for preprocessing the range data to extract effective clusters; a corner recognition unit for extracting obstacle corners from the effective clusters; and a parking location setting unit for recognizing a main reference corner, which is closest to a subjective vehicle and has an adjacent space satisfying an available parking space condition, and a sub reference corner, which exists toward the adjacent space in a direction opposite to a vehicle width direction from the main reference corner, and corresponds to a point on a closest effective cluster within a distance between a vehicle width and a vehicle length, from the obstacle corners to set a target parking location.

11 Claims, 52 Drawing Sheets

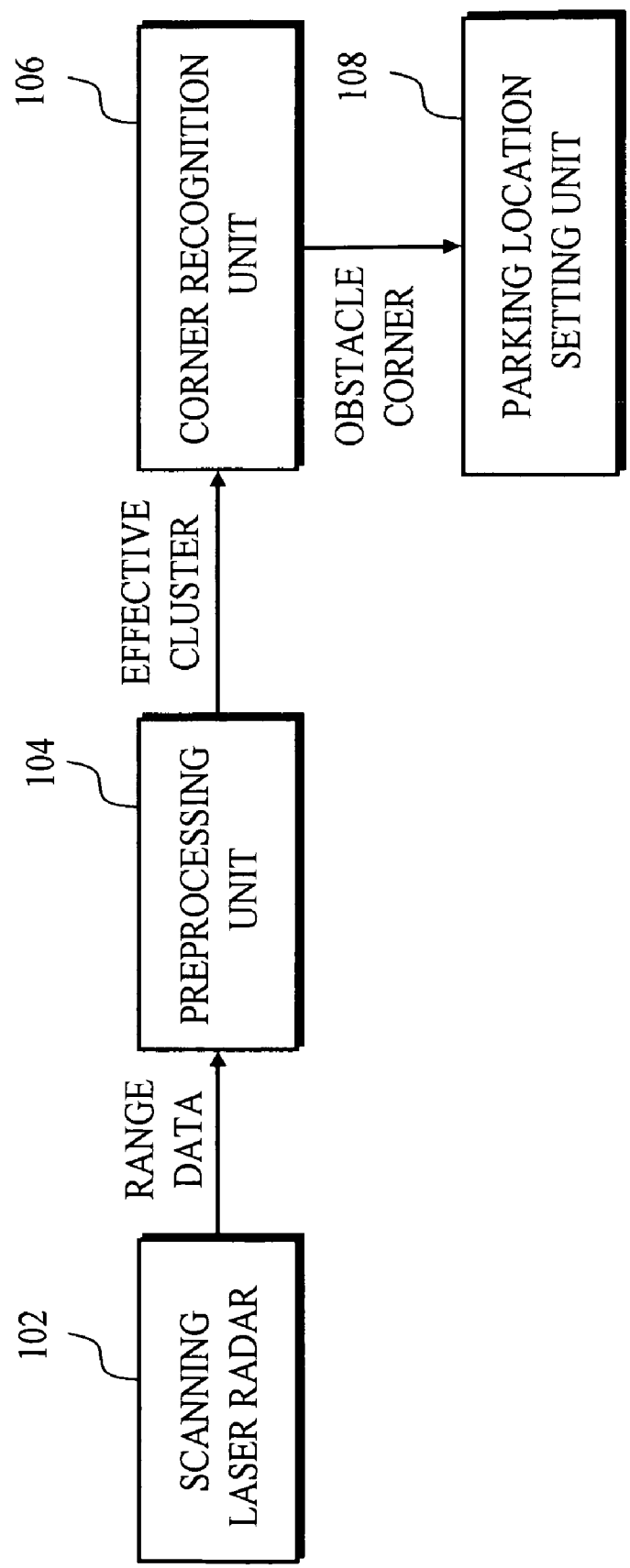

METHOD AND SYSTEM FOR RECOGNIZING TARGET PARKING LOCATION OF VEHICLE BY DETECTING RANGE DATA

CROSS-REFERENCE TO RELATED APPLICATION

This non-provisional application claims priority under 35 U.S.C §119(a) on Patent Application No. 10-2007-0108342 filed in Korea on Oct. 26, 2007, the entire contents of which are hereby incorporated by reference.

TECHNICAL FIELD

The present disclosure relates to a method and a system for recognizing a target parking location of a vehicle. More particularly, the embodiments of the invention relates to a method and a system for recognizing a target parking location of a vehicle, wherein a scanning laser radar is mounted on the rear portion of a vehicle to detect range data, which is used to set the target parking location for perpendicular parking.

BACKGROUND OF DISCLOSURE

Female and inexperienced drivers have some difficulty parking their cars in parking lots, and may even cause collision. As such, many inexperienced drivers are under stress in connection with parking, and even tend to avoid driving.

In light of this, it has been proposed to mount sensors on the vehicle and automatically recognize a parking location so that the driver can park more conveniently. Sensors mounted on vehicles to automatically recognize the parking location are based on binocular stereo, motion stereo, light plane projection, ultrasonic waves, SGG (Short Range Radar), etc.

The method relying on binocular stereo or motion stereo to recognize an available parking space (and thus a target parking location) has a problem in that it does not work properly in the dark, and severe reflection from the vehicle surface makes it difficult to extract feature points. Particularly, black vehicles make it more difficult to extract feature points and obtain three-dimensional information regarding vehicles.

The method relying on light plane projection to recognize an available parking space (and thus a target parking location) employs a light plane projector to project a planar light source, and recognizes a light stripe created on the object. The light stripe is used to recognize vehicles on both sides of the available parking space and determine the target parking location. However, this method cannot be used in the daytime (i.e. when sunlight is strong), although it may supplement the above-mentioned method relying on binocular stereo or motion stereo in the nighttime or inside underground parking lots. Particularly, in the case of black vehicles, the amount of reflected light is insufficient, and the reliability of obtained three-dimensional information is degraded.

The method relying on ultrasonic sensors to recognize an available parking space (and thus a target parking location) is usually employed for parallel parking. Specifically, while the vehicle is moving, the distance to obstacles inside the parking slot is measured to recognize an available parking space (and thus the target parking location). However, this method has a problem in that, when already parked vehicles are not parallel with the moving direction, severe noise occurs and degrades the reliability of obtained three-dimensional information. Particularly, when intensive driving operations are necessary near the target parking slot (e.g. garage parking), the ultrasonic sensors are at an angle with regard to already parked vehicles, and the reliability of obtained three-dimensional information is low.

The method relying on SRR (Short Range Radar) to recognize an available parking space (and thus a target parking location) is usually employed for parallel parking, and is similar to the method relying on ultrasonic sensors. However, the variance of distance information is large, and noise is severe at distance-discontinuous points. Although this method provides distance information within a comparatively large FOV (Field of View), it is unsuited to recognizing the contour of a vehicle from points with severe electromagnetic reflection.

DISCLOSURE OF THE INVENTION

One embodiment of the invention provides a method and a system for recognizing a target parking location of a vehicle, wherein a scanning laser radar is mounted on the rear portion of the vehicle to detect range data, which is used to set the target parking location for perpendicular parking.

Further, another embodiment provides a system for recognizing a target parking location of a vehicle, the system including a scanning laser radar for detecting range data reflected and directed from a rear surface of the vehicle; a preprocessing unit for preprocessing the range data to extract effective clusters; a corner recognition unit for extracting obstacle corners from the effective clusters; and a parking location setting unit for recognizing a main reference corner and a sub reference corner from the obstacle corners to set a target parking location, the main reference corner being an obstacle corner closest to a subjective vehicle and having an adjacent space satisfying an available parking space condition, the sub reference corner being an obstacle corner existing toward the adjacent space in a direction opposite to a vehicle width direction from the main reference corner and being a point on a closest effective cluster within a distance between a vehicle width and a vehicle length.

In accordance with another aspect of the embodiment, there is provided a method for recognizing a target parking location of a vehicle by a system having a scanning laser radar, a preprocessing unit, a corner recognition unit, and a parking location setting unit, the method including the steps of detecting range data by the scanning laser radar; preprocessing the range data by the preprocessing unit to extract effective clusters; extracting obstacle corners from the effective clusters by the corner recognition unit; and recognizing a main reference corner and a sub reference corner from the obstacle corners by the parking location setting unit to set a target parking location, the main reference corner being an obstacle corner closest to a subjective vehicle and having an adjacent space satisfying an available parking space condition, the sub reference corner being an obstacle corner existing toward the adjacent space in a direction opposite to a vehicle width direction from the main reference corner and being a point on a closest effective cluster within a distance between a vehicle width and a vehicle length.

According to yet another aspect of the embodiment, a scanning laser radar is mounted on the rear portion of a vehicle to detect range data, which is used to set the target parking location for perpendicular parking. This is advantageous in that the target parking location can be determined even in cases that can hardly be handled by conventional methods (e.g. daytime, nighttime, outdoor, underground, backlight).

BRIEF DESCRIPTION OF THE DRAWINGS

The above and other objects, features and advantages of the present invention will be more apparent from the following detailed description taken in conjunction with the accompanying drawings, in which:

FIG. 1 shows a system for recognizing a target parking location of a vehicle according to an embodiment of the present invention;

FIG. 10a shows an effective cluster constituting a straight line and FIG. 10b shows small rectangular corner fitting error value for the effective cluster in the FIG. 10a;

FIG. 17b shows the result of applying the ROI to the result of corner recognition shown in FIG. 17a.

DETAILED DESCRIPTION OF THE EXEMPLARY EMBODIMENTS

Figure 2A:
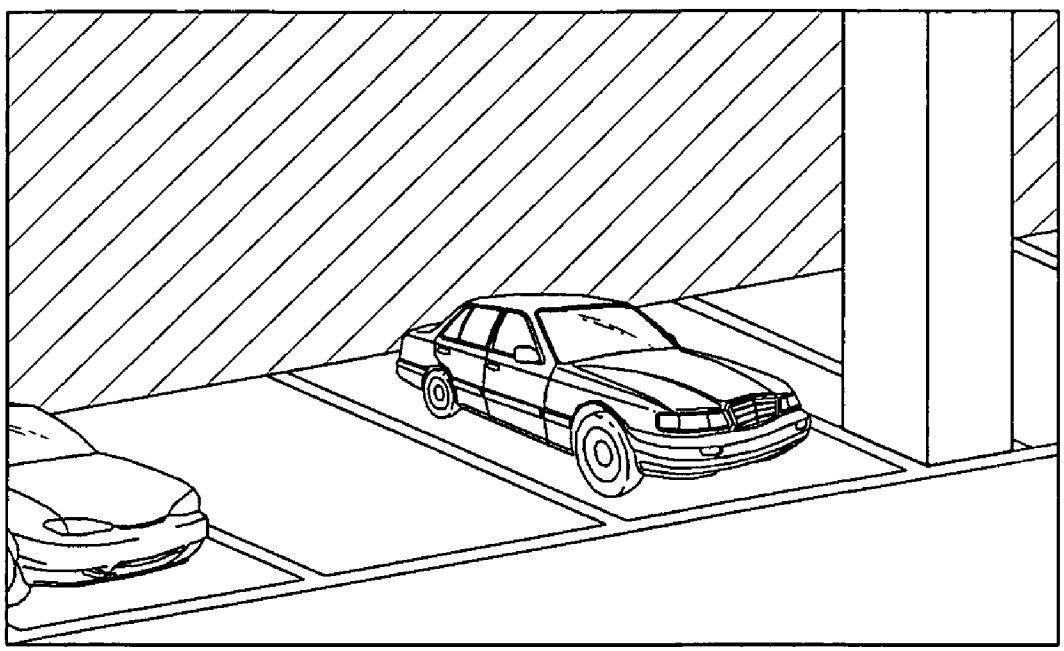
FIG. 2a shows a photograph of a target parking area between vehicles in an underground parking lot, which has been taken inside the driver's vehicle.

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein is omitted to avoid making the subject matter of the present invention unclear.

FIG. 1 shows a system for recognizing a target parking location of a vehicle according to an embodiment of the present invention.

As shown in FIG. 1, the system for recognizing a target parking location of a vehicle according to an embodiment of the present invention includes a scanner laser radar 102, a preprocessing unit 104, a corner recognition unit 106, and a parking location setting unit 108.

The scanning laser radar 102 detects range data reflected and directed from the rear surface of the vehicle. Particularly, the scanning laser radar 102 is mounted on the rear surface of the vehicle to scan light (i.e. laser) and obtain a distance and angle data pair from the reflected light. The distance and angle data pair obtained in this manner is referred to as range data.

The preprocessing unit 104 preprocesses the range data obtained by the scanning laser radar 102 and extracts effective clusters. The preprocessing includes the steps of removing ineffective data and isolated data from the range data to extract effective range data, recognizing occlusions from the effective range data, and removing small clusters from the effective range data.

FIG. 2 shows range data detected by a laser radar-type sensor unit 102 of the system for recognizing a target parking location of a vehicle according to an embodiment of the present invention.

Figure 2B:
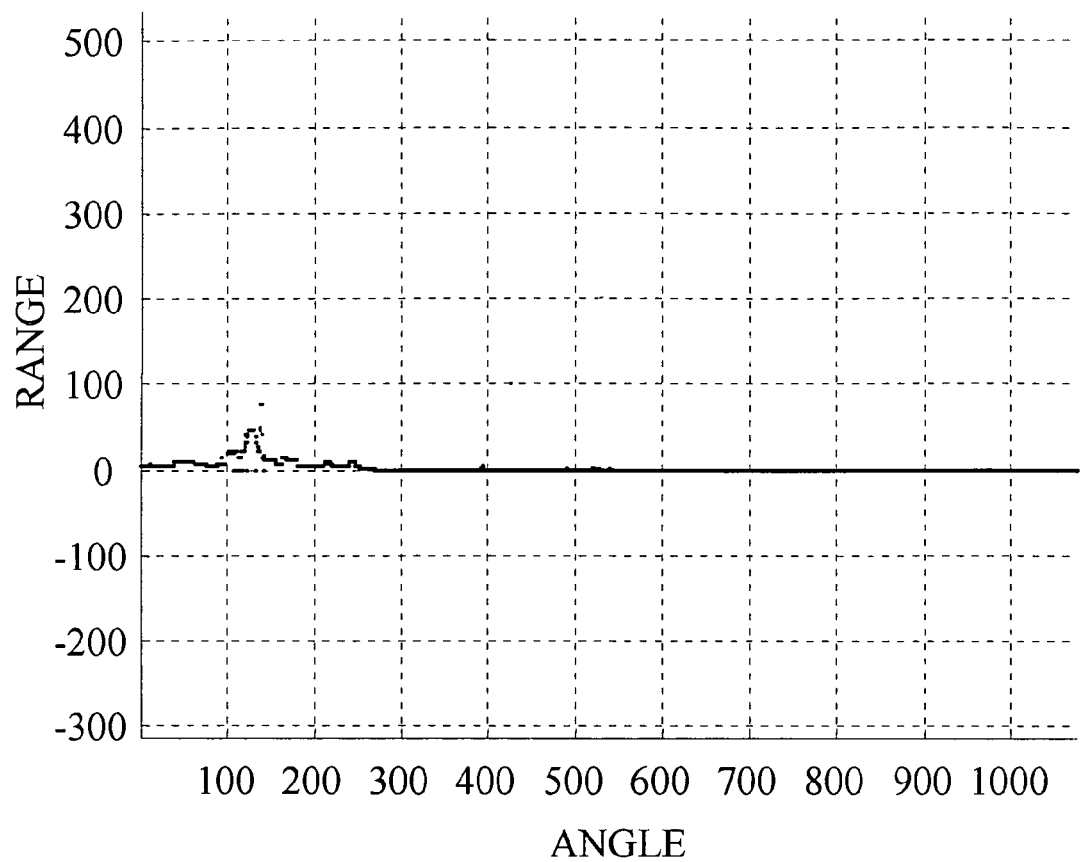
FIG. 2b shows the output of the scanning laser radar of the vehicle in the corresponding area.

Particularly, FIG. 2a shows a photograph of a target parking area between vehicles in an underground parking lot, which has been taken inside the driver's vehicle. FIG. 2b shows the output of the scanning laser radar of the vehicle in the corresponding area.

In FIG. 2b, the range refers to the distance from the scanning laser radar 102 of the vehicle, and the angle refers to the scanning angle of the scanning laser radar.

Figure 3:
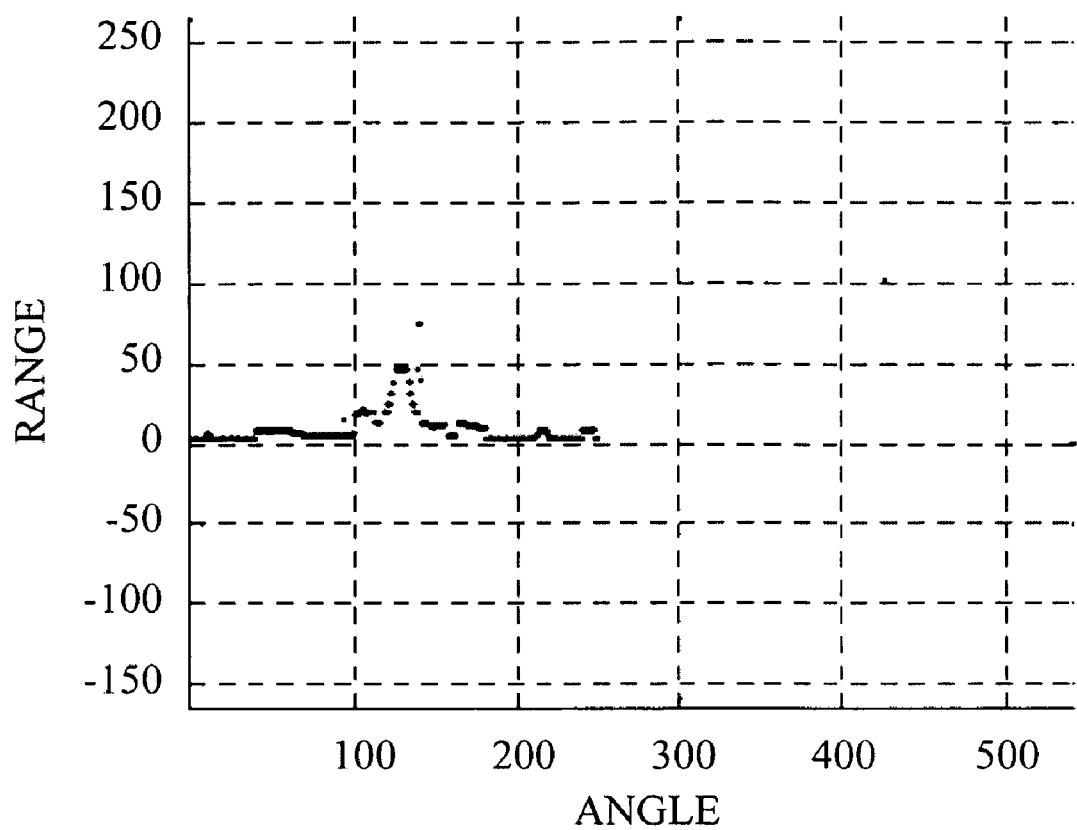
FIG. 3 shows effective range data obtained by removing ineffective data and isolated data from range data detected by a scanning laser radar 102 of the system for recognizing a target parking location of a vehicle according to an embodiment of the present invention.

FIG. 3 shows effective range data obtained by removing ineffective data and isolated data from range data detected by a scanning laser radar 102 of the system for recognizing a target parking location of a vehicle according to an embodiment of the present invention.

As shown in FIG. 3, the preprocessing unit removes ineffective data, which has a range value of zero, and isolated data, which has been insolated by random noise, from the range data show in FIG. 2b. Particularly, if the smaller one of distances from a point to left and right points adjacent to it is above a threshold (e.g. 0.5 m), that point is regarded as isolated data and is removed.

FIG. 4 shows the result of recognizing occlusions after removing ineffective data and isolated data from range data detected by the scanning laser radar 102 of the system for recognizing a target parking location of a vehicle according to an embodiment of the present invention.

Figure 4A:
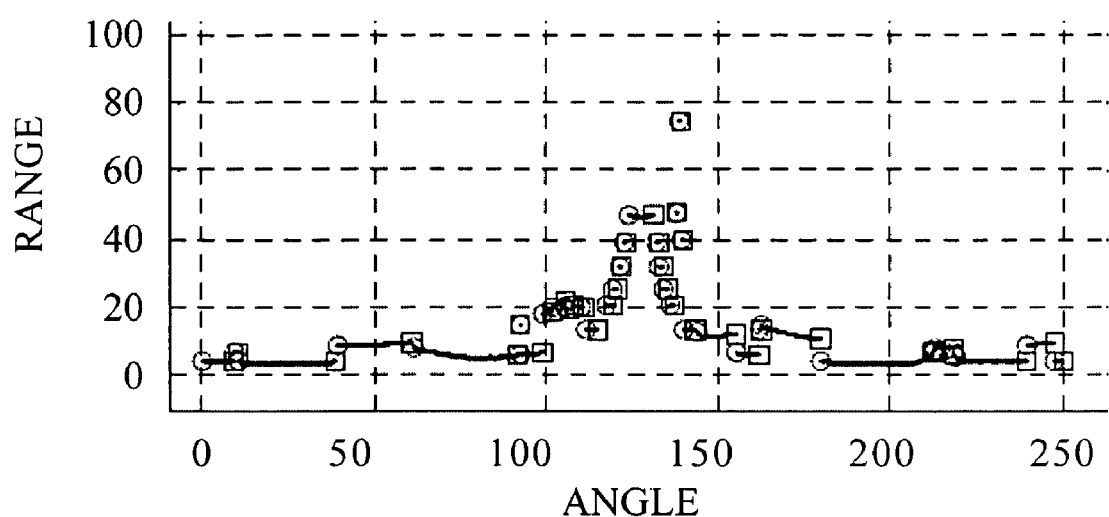
FIG. 4a shows the result of recognizing occlusions after removing ineffective data and isolated data from range data detected by the scanning laser radar 102 of the system for recognizing a target parking location of a vehicle according to an embodiment of the present invention.
Figure 4B:
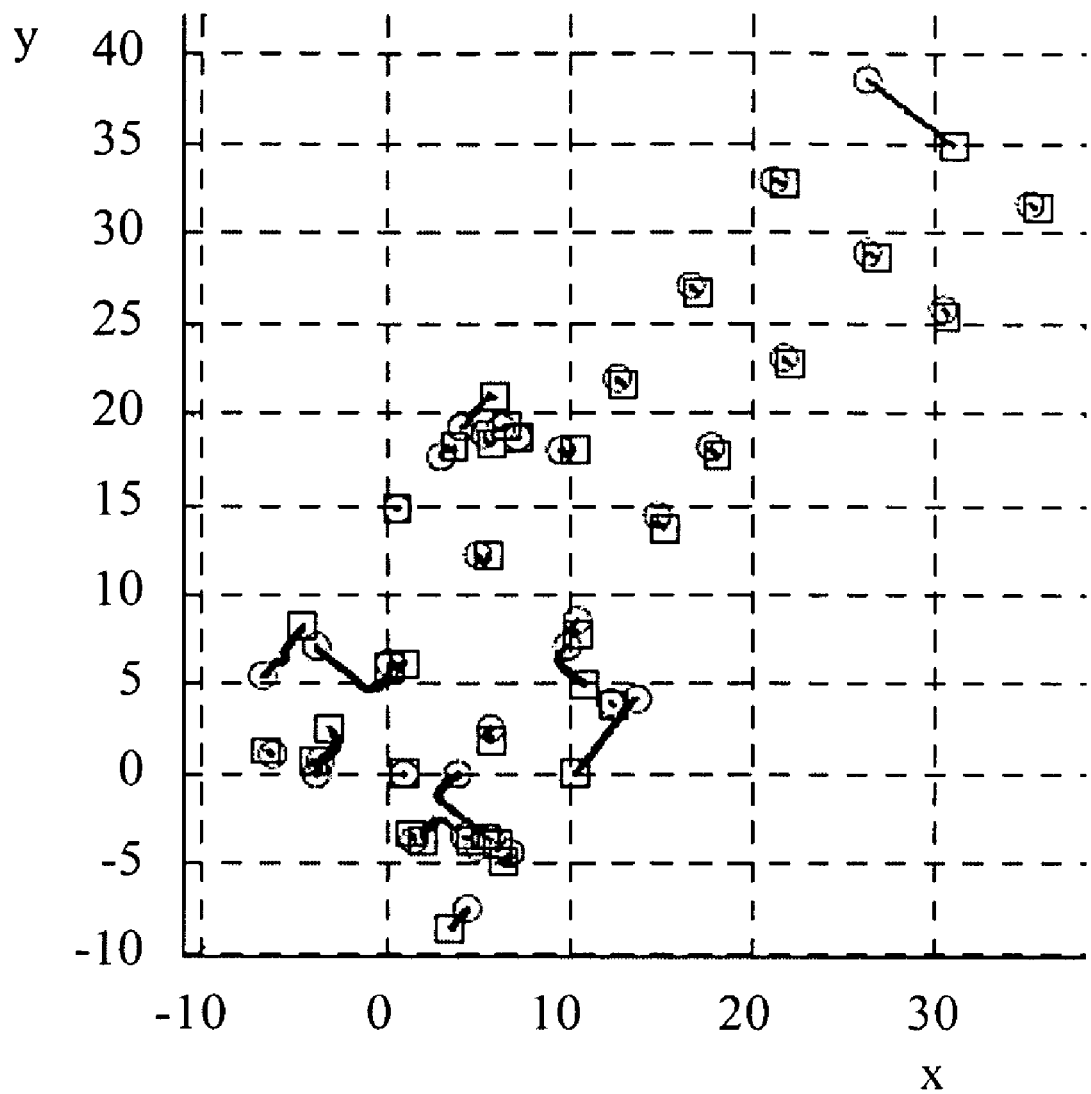
FIG. 4b shows the result of converting effective range data and recognized occlusions in terms of a Cartesian coordinate system and displaying them.

As used herein, an occlusion refers to a point making range data discontinuous (i.e. continuous elsewhere). In addition, continuous range data between occlusions are referred to as a cluster. It will be assumed that pieces of range data are arranged in the scanning angle order and are inspected successively by scanning them from left to right. If an effective cluster begins, the left end of the cluster is recognized as the leftmost occlusion, and the point at which the effective cluster ends is recognized as the rightmost occlusion. For example, if the distance between continuous $(n-1)^{th}$ and $n^{th}$ range data is above a threshold (e.g. 0.5 m), the $(n-1)^{th}$ point is recognized as the right end, and the $n^{th}$ point is recognized as the left end. In FIG. 4a, the left end of an occlusion is marked by a circle, and the right end is marked by a square. FIG. 4b shows the result of converting effective range data and recognized occlusions in terms of a Cartesian coordinate system and displaying them.

FIG. 5 shows the result of extracting effective clusters by removing small clusters from clusters in the system for recognizing a target parking location of a vehicle according to an embodiment of the present invention.

Figure 5A:
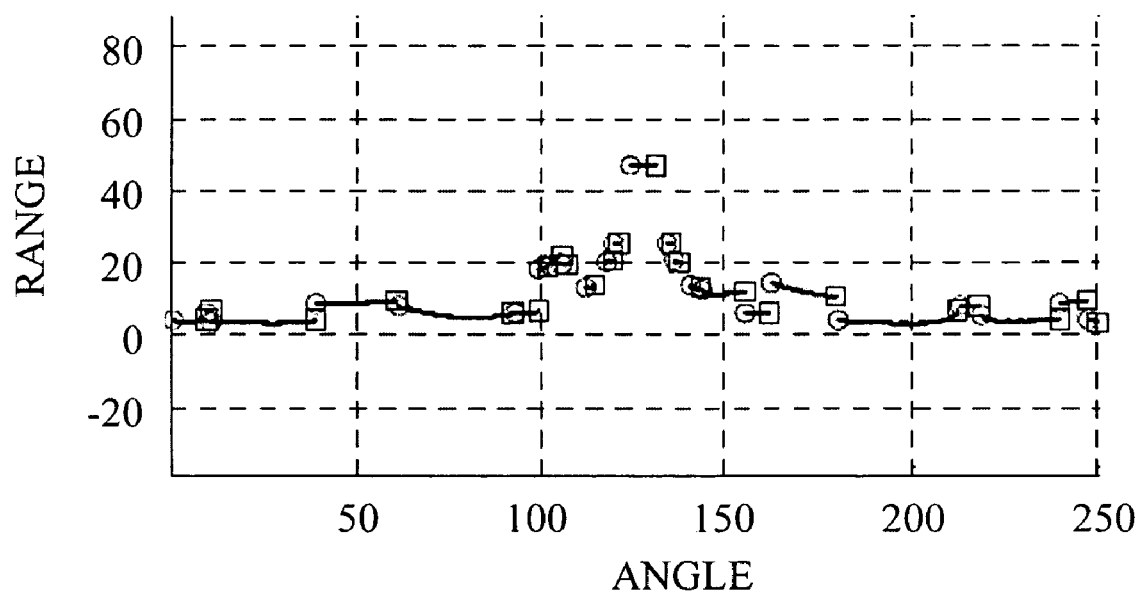
FIGS. 5a and 5b show results of removing smaller clusters from clusters shown in FIGS. 4a and 4b to extract effective clusters, respectively.
Figure 5B:
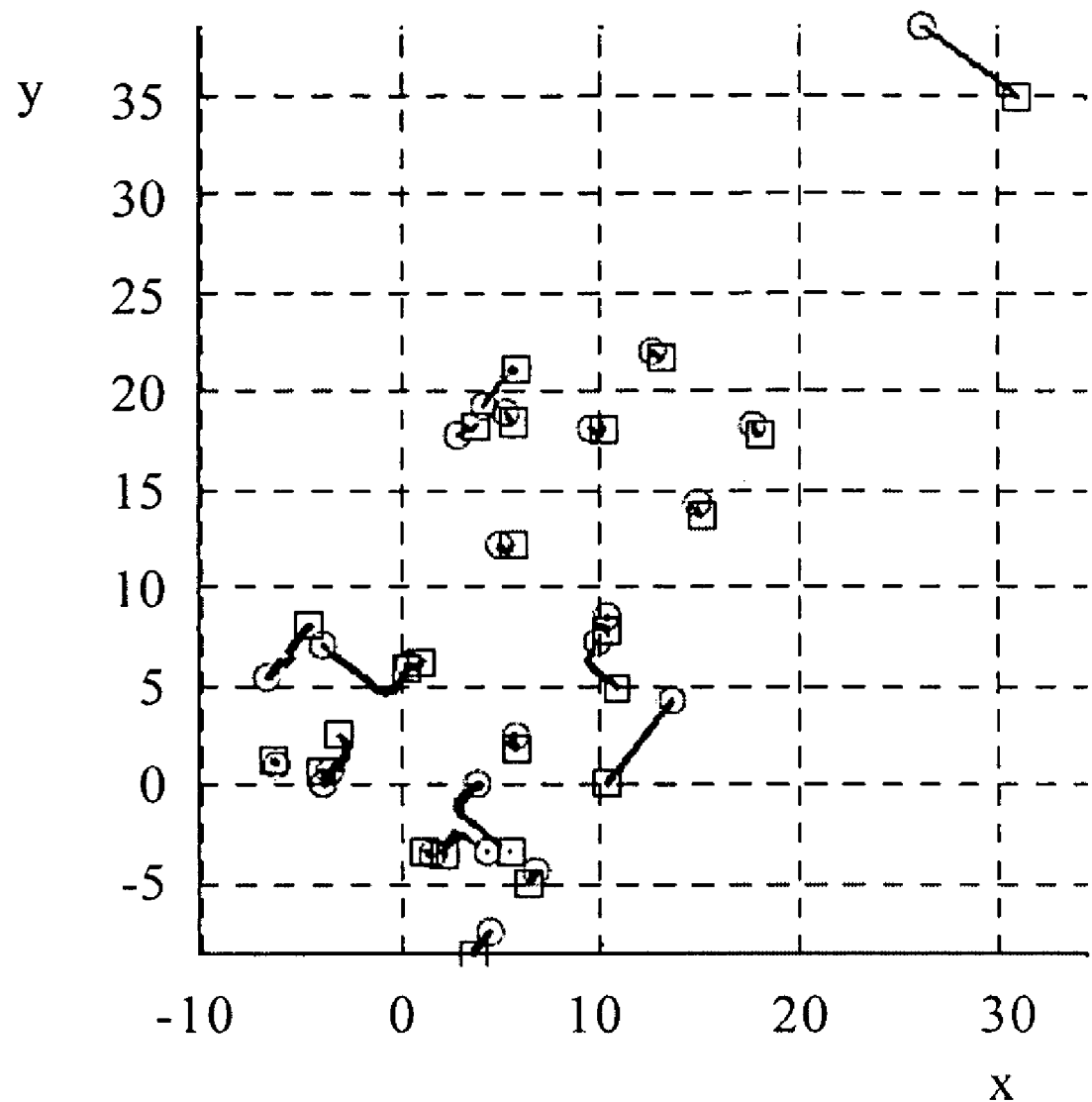

Particularly, among recognized clusters as shown in FIG. 4, those having a too small size are removed based on judgment that they result from noise. It will be assumed that the number of points from the left end of a cluster to the right end is referred to as a point number, and the physical distance is referred to as its length. If a cluster has a length below to a threshold (e.g. 0.25 m) or a point number below to a threshold (e.g. five), it is regarded as a small cluster and removed. FIGS. 5a and 5b show results of removing smaller clusters from clusters shown in FIGS. 4a and 4b to extract effective clusters, respectively.

Unless otherwise mentioned, clusters will hereinafter refer to effective clusters.

The corner recognition unit 106 extracts obstacle corners from effective clusters.

An obstacle corner may be the corner of a rectangular cluster, i.e. an L-shaped effective cluster, or the corner of a round corner cluster, i.e. an effective cluster having the combined shape of an elliptical arc and a straight line.

Assuming that range data obtained from the scanning laser radar is related to a parking lot, major recognition objects (i.e. vehicles and building structures) have the shape of L-shaped corners, which means that recognition of corners lead to recognition of vehicles in the parking lot. In this case, obstacles other than vehicles do not look like L-shaped corners, and can be omitted in the process of recognizing a target parking location.

Figure 6:
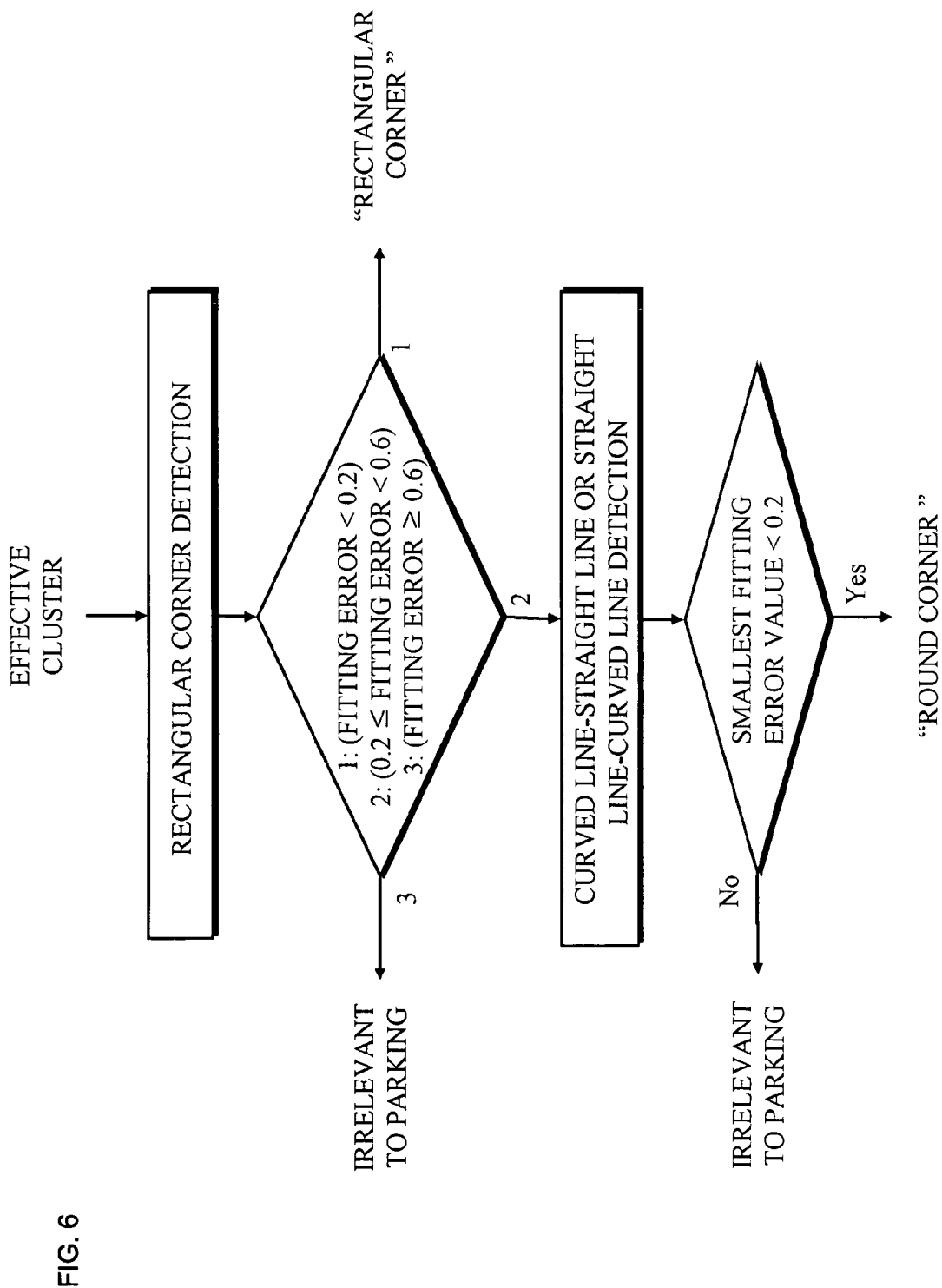
FIG. 6 is a flowchart showing processes of recognizing corners from effective clusters by the system for recognizing a target parking location of a vehicle according to an embodiment of the present invention.

FIG. 6 is a flowchart showing processes of recognizing corners from effective clusters by the system for recognizing a target parking location of a vehicle according to an embodiment of the present invention.

As shown in FIG. 6, corner recognition consists of rectangular corner recognition and round corner recognition. The rear and front surfaces of most vehicles can be approximated by L-shaped fitting, i.e. two straight lines intersecting with each other at the right angle. However, some automobiles have a largely curved front surface, which should be subjected to round corner recognition, i.e. expressed as a combination of a straight line and an elliptical arc joining with each other at a point.

If the fitting error of rectangular corner recognition is below a lower threshold (0.2, in the present embodiment), the object is recognized as a rectangular corner. If the fitting error is above the lower threshold but below an upper threshold (0.6, in the present embodiment), round corner recognition is tried. If the fitting error is above the upper threshold, the object is considered a straight line irrelevant to parking, and is ignored.

A round corner cluster detected as a result of round corner recognition is characterized in that two lines leading from the inflection point of the effective cluster to both end points thereof are an elliptical arc and a straight line, respectively.

If the fitting error of round corner recognition is below a predetermined threshold (0.2, in the present embodiment), the object is recognized as a round corner. If the fitting error is above the predetermined threshold (0.2, in the present embodiment), the object is considered irrelevant to parking, and is ignored.

More particularly, during corner recognition, every point of an effective cluster is assumed as the vertex of the corresponding corner, and in order to recognize the optimum corner, a result with the smallest error is recognized as a rectangular corner candidate of the effective cluster. An L-shaped template consists of two straight lines perpendicular to each other. Points preceding the reference point within an effective cluster must be close to the first straight line, and following points must be close to the second straight line. Therefore, it can be said that L-shaped template matching is a task of minimizing the sum of errors regarding the first straight line (points preceding the reference point) and the second straight line (points following the reference point) based on a requirement that two straight lines must be perpendicular to each other.

Since the two straight lines are perpendicular, the first and second straight lines 11 and 12 can be defined by Equation (1) below.

$$l_1 : ax+by+c=0$$

$$l_2 : bx-ay+d=0 \qquad (1)$$

Figure 7:
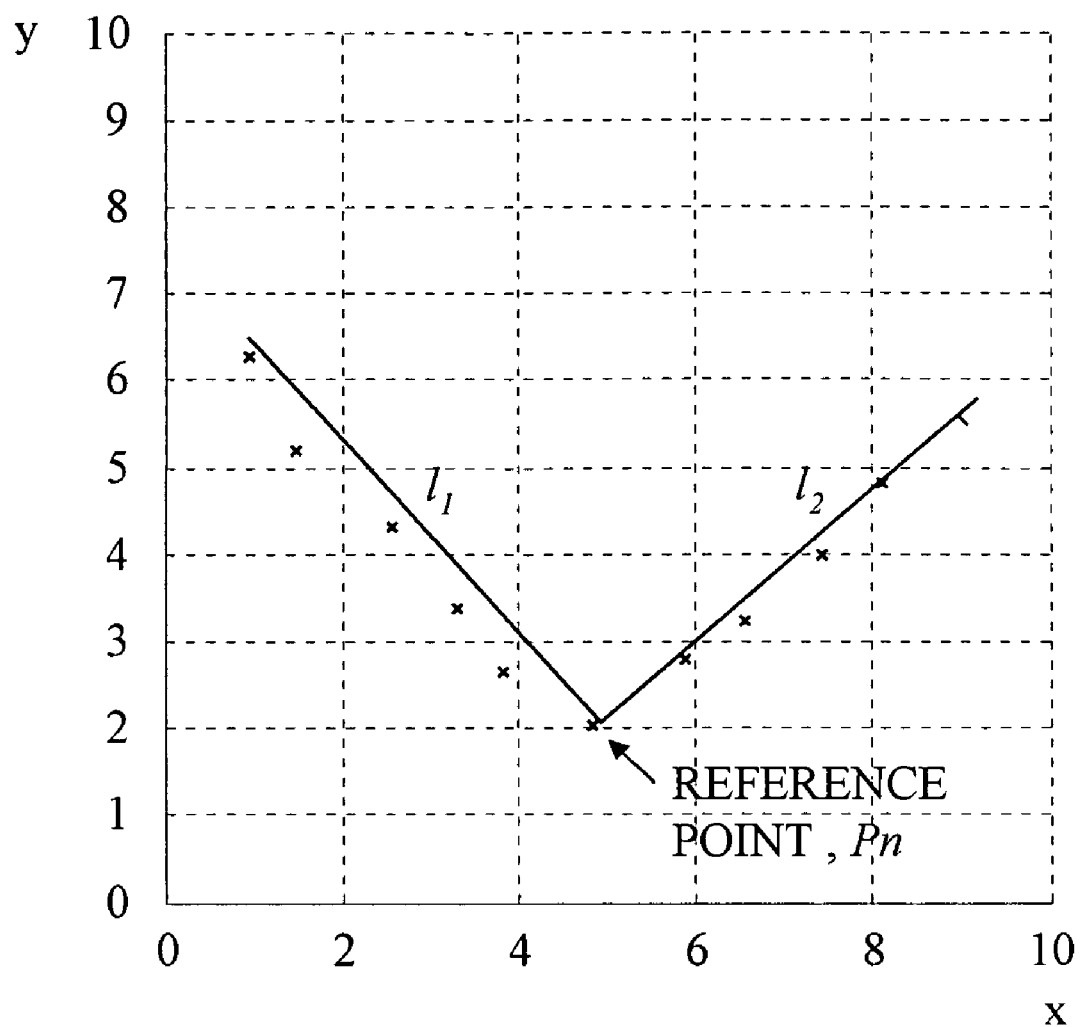
FIG. 7 shows a rectangular corner recognized from an effective cluster by the system for recognizing a target parking location of a vehicle according to an embodiment of the present invention.

FIG. 7 shows a rectangular corner recognized from an effective cluster by the system for recognizing a target parking location of a vehicle according to an embodiment of the present invention.

It will be assumed that the number of points of a cluster is N, and each point is given an index starting from 1. The reference point has an index of n, as shown in FIG. 7. Then, points in the index range of 1-n must satisfy the straight line equation $l_1$, and points in the index range of n-N must satisfy the straight line equation $l_2$.

Application of Equation (1) to every point gives Equation (2) below.

$$\underbrace{\begin{bmatrix} x_1 & y_1 & 1 & 0 \\ \vdots & & & \\ x_n & y_n & 1 & 0 \\ -y_n & x_n & 0 & 1 \\ \vdots & & & \\ -y_N & x_N & 0 & 1 \end{bmatrix}}_{A_n} \cdot \underbrace{\begin{bmatrix} a \\ b \\ c \\ d \end{bmatrix}}_{X_n} = 0 \qquad (2)$$

Parameter matrix $X_n$ satisfying Equation (2) corresponds to the null vector of matrix $A_n$. Therefore, by obtaining the null vector of $A_n$ based on SVD (Singular Value Decomposition) as defined by Equation (3) below, parameters a, b, c, and d can be estimated.

$$[U_n, S_n, V_n] = SVD(A_n) \qquad (3)$$

wherein $U_n$ refers to an output-related basis matrix, $S_n$ refers to a singular value matrix, and $V_n$ refers to an input-related value matrix.

If the singular value corresponding to the null vector is zero, it corresponding to a trivial ideal value, and is ignored. It will be assumed that an LS (Least Square) fitting error is a rectangular corner fitting error (C, n) related to the $n^{th}$ point of cluster C. Then, $S_n(4, 4)$ corresponds to rectangular corner fitting error (C, n), and the fourth column of $V_n$ corresponds to estimated parameters of a, b, c, and d.

$$S_n = \begin{bmatrix} 19.8455 & 0 & 0 & 0 \\ 0 & 15.4982 & 0 & 0 \\ 0 & 0 & 1.0075 & 0 \\ 0 & 0 & 0 & 0.3905 \rightarrow LS \text{ fitting error} \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}$$

Rectangular corner fitting error (C, n) is measured with regard to the $2^{nd}$ to $(N-1)^{th}$ points of cluster C, and a point having the smallest value is recognized as a rectangular cluster corner candidate of the cluster.

FIG. 8 shows a fitting error, which depends on the reference point of an effective cluster, and a rectangular corner candidate in the system for recognizing a target parking location of a vehicle according to an embodiment of the present invention.

Figure 8A:
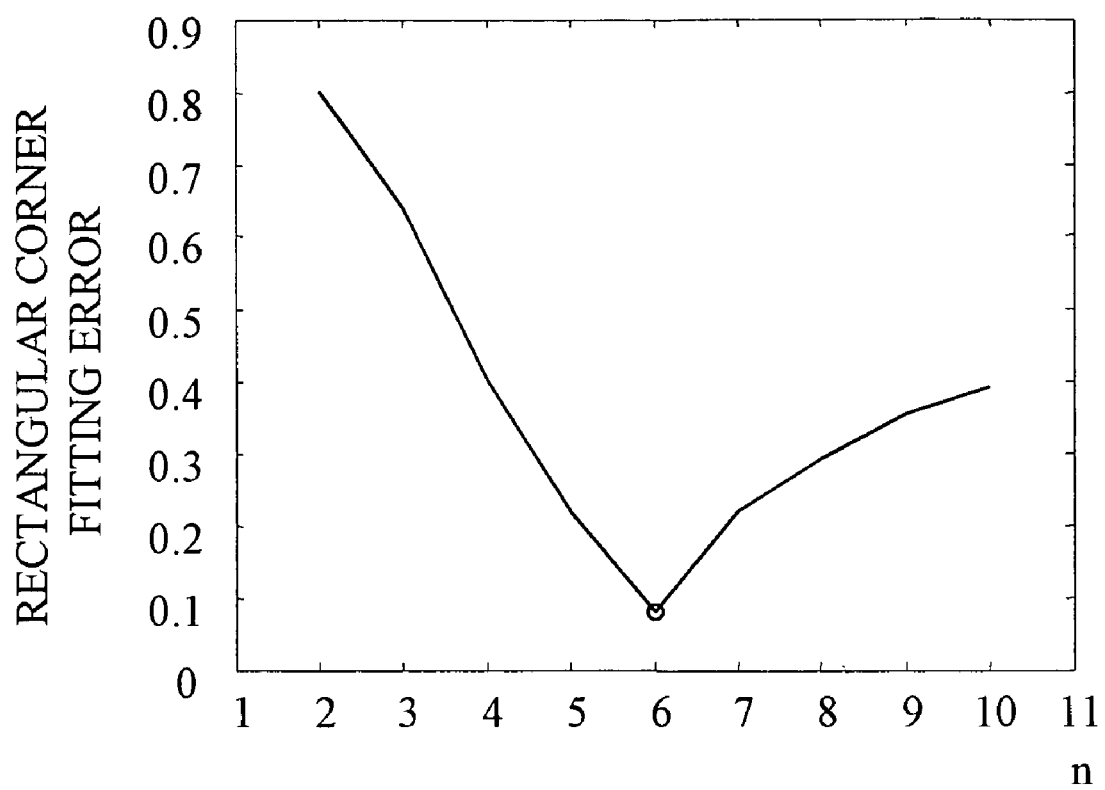
FIG. 8a is a graph showing the rectangular corner fitting error (C, n) measured with reference to $2^{nd}$ to $(n-1)^{th}$ points.
Figure 8B:
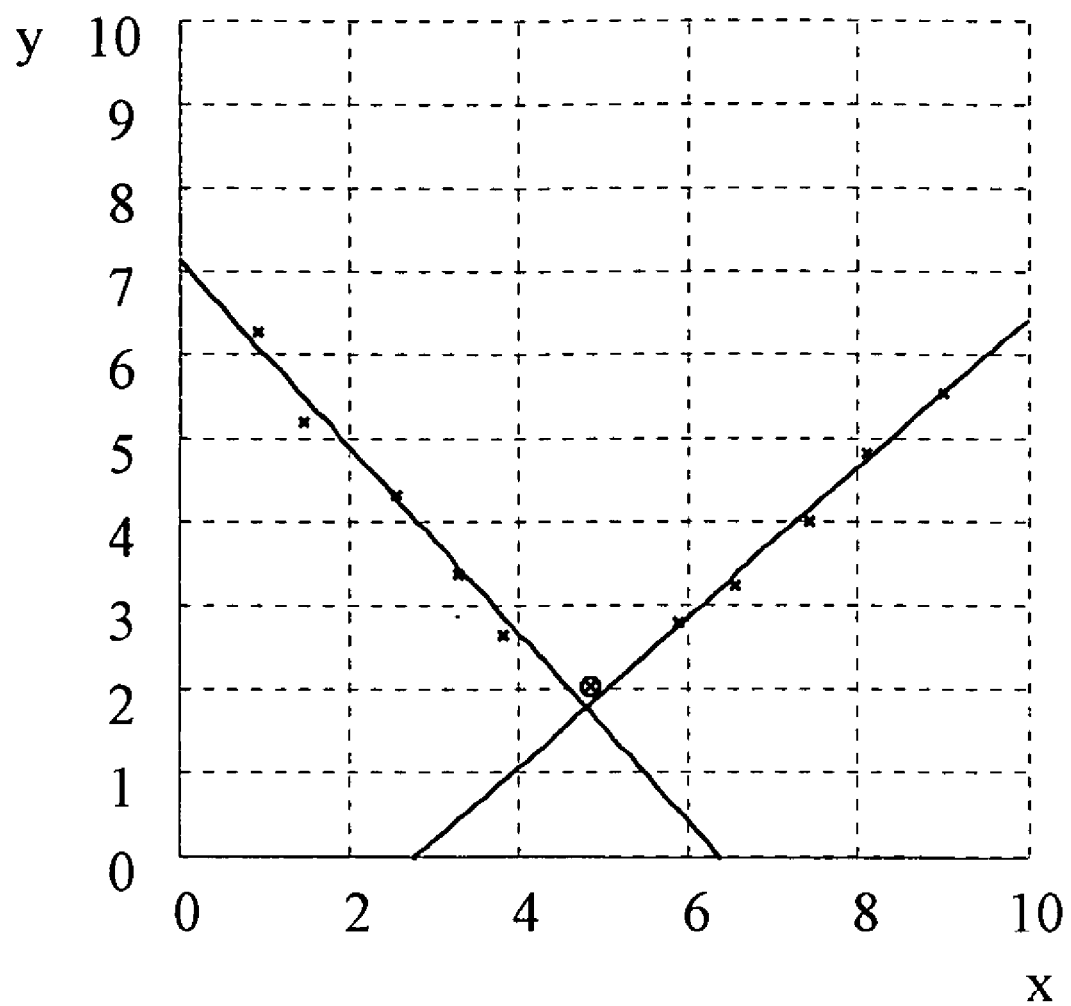
FIG. 8b shows a reference point having the smallest error value, and a recognized rectangular corner candidate.

Particularly, FIG. 8a is a graph showing the rectangular corner fitting error (C, n) measured with reference to $2^{nd}$ to $(n-1)^{th}$ points, and FIG. 8b shows a reference point having the smallest error value, and a recognized rectangular corner candidate.

Figure 9:
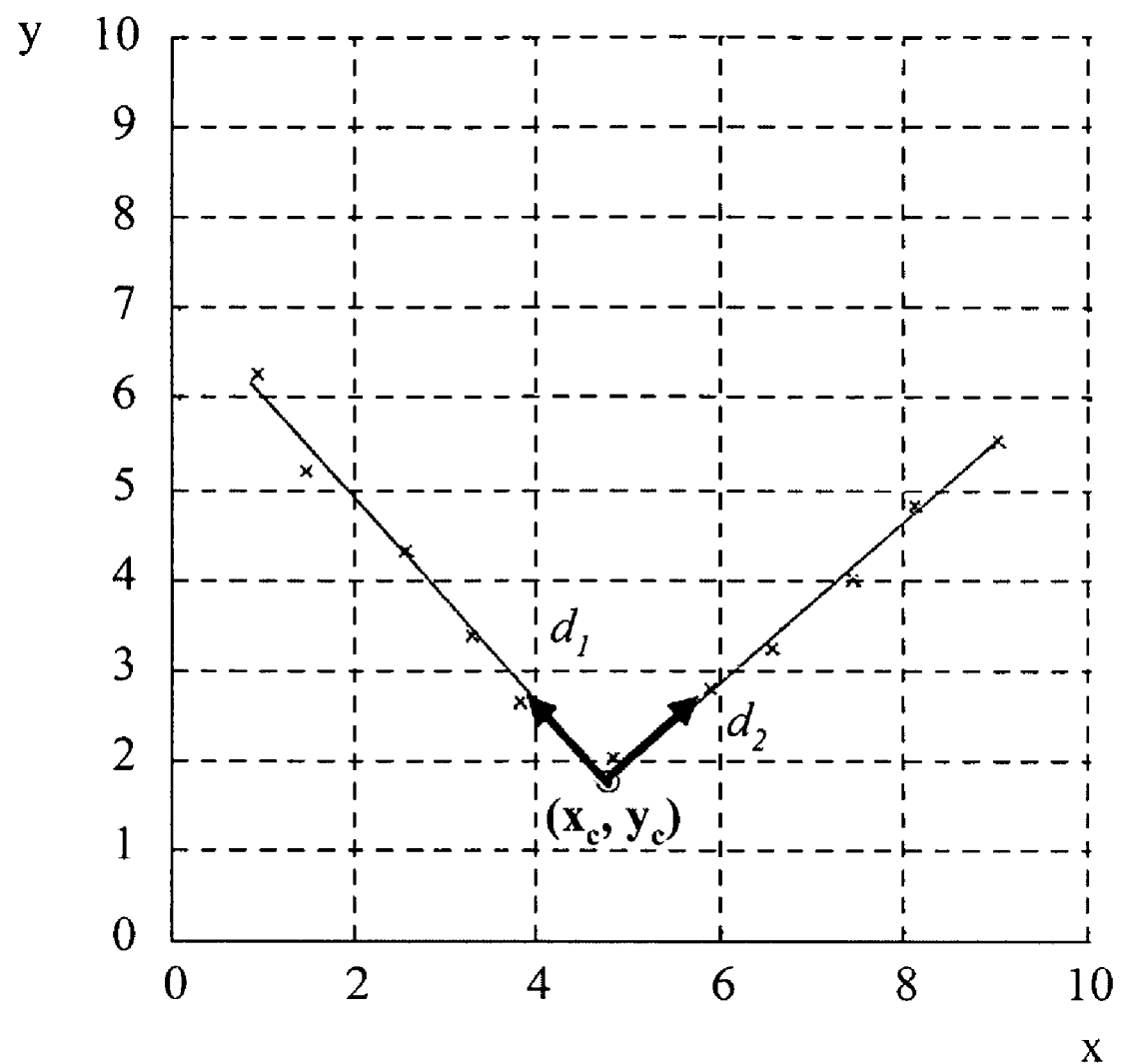
FIG. 9 shows two straight lines extending from a corner point of an effective cluster in the system for recognizing a target parking location of a vehicle according to an embodiment of the present invention.

FIG. 9 shows two straight lines extending from a corner point of an effective cluster in the system for recognizing a target parking location of a vehicle according to an embodiment of the present invention.

As shown in FIG. 9, the point ($x_c$, $y_c$) of intersection between both straight lines is recognized as a corner point, and uniform vectors $d_1$ and $d_2$ parallel with both straight lines are calculated. In this case, $d_1$ and $d_2$ are set to indicate the direction of long and short sides, respectively.

FIG. 10 shows an effective cluster, which constitutes a straight line and has a small rectangular corner fitting error value, in the system for recognizing a target parking location of a vehicle according to an embodiment of the present invention.

Figure 10A:
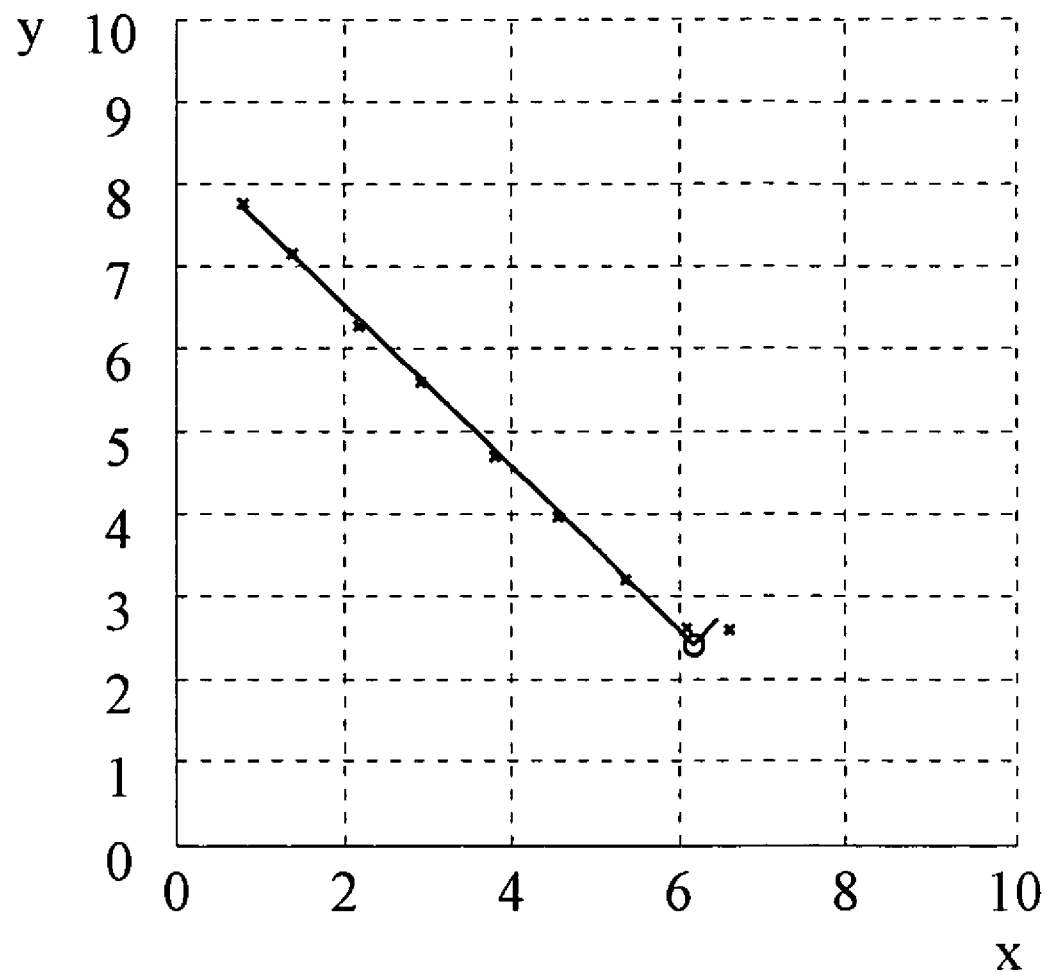
Figure 10B:
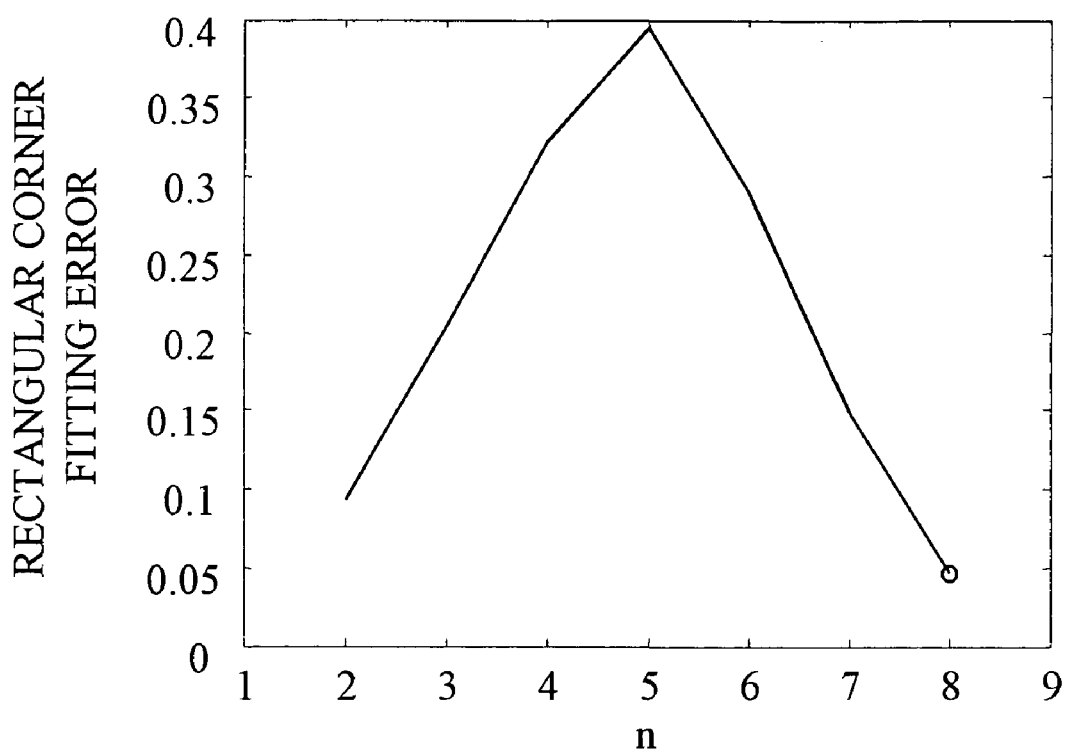

As shown in FIGS. 10a and 10b, the rectangular corner fitting error has a very small value when a cluster constitutes a straight line and when an end point of the cluster deviates from the straight line.

This problem is compensated for by using a line fitting error, i.e. LS fitting error based on an assumption that a cluster is a straight line. Particularly, assuming that every point of a cluster satisfies the equation of straight line l as defined by Equation (4) below, parameter matrix X of Equation (5) is the null vector of matrix B, and the singular value corresponding to the null vector of B is the line fitting error.

$$l : ax + by + c = 0 \qquad (4)$$

$$\underbrace{\begin{bmatrix} x_1 & y_1 & 1 \\ \vdots & & \\ x_N & y_N & 1 \end{bmatrix}}_{B} \cdot \underbrace{\begin{bmatrix} a \\ b \\ c \end{bmatrix}}_{X} = 0 \qquad (5)$$

The corner error of specific cluster C, i.e. $\epsilon_{corner}(C)$, is obtained by dividing the smallest value of rectangular corner fitting error $\epsilon_{rectangular\ corner}(C, n)$ by the line fitting error $\epsilon_{line}(C)$, as defined by Equation (6) below.

$$\varepsilon_{corner}(C) = \frac{\min_n \varepsilon_{rectangular\ corner}(C, n)}{\varepsilon_{line}(C)} \quad (6)$$

FIG. 11 shows an effective cluster, which constitutes a straight line and has a small rectangular corner fitting error value, in the system for recognizing a target parking location of a vehicle according to an embodiment of the present invention.

When a cluster is a straight line, the line fitting error may have a small value. Therefore, the corner error has a larger value to prevent it from being erroneously recognized as a rectangular corner.

Figure 11A:
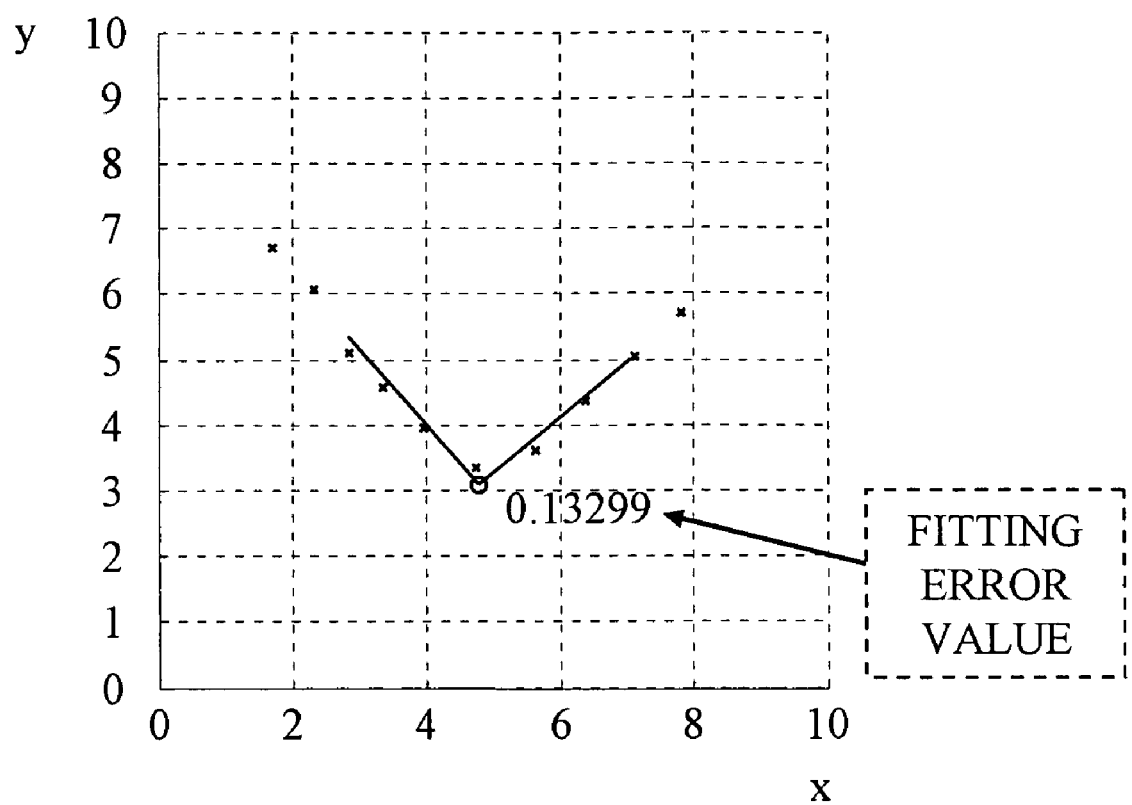
FIGS. 11a and 11b show clusters corresponding to a corner cluster and a straight line, respectively.
Figure 11B:
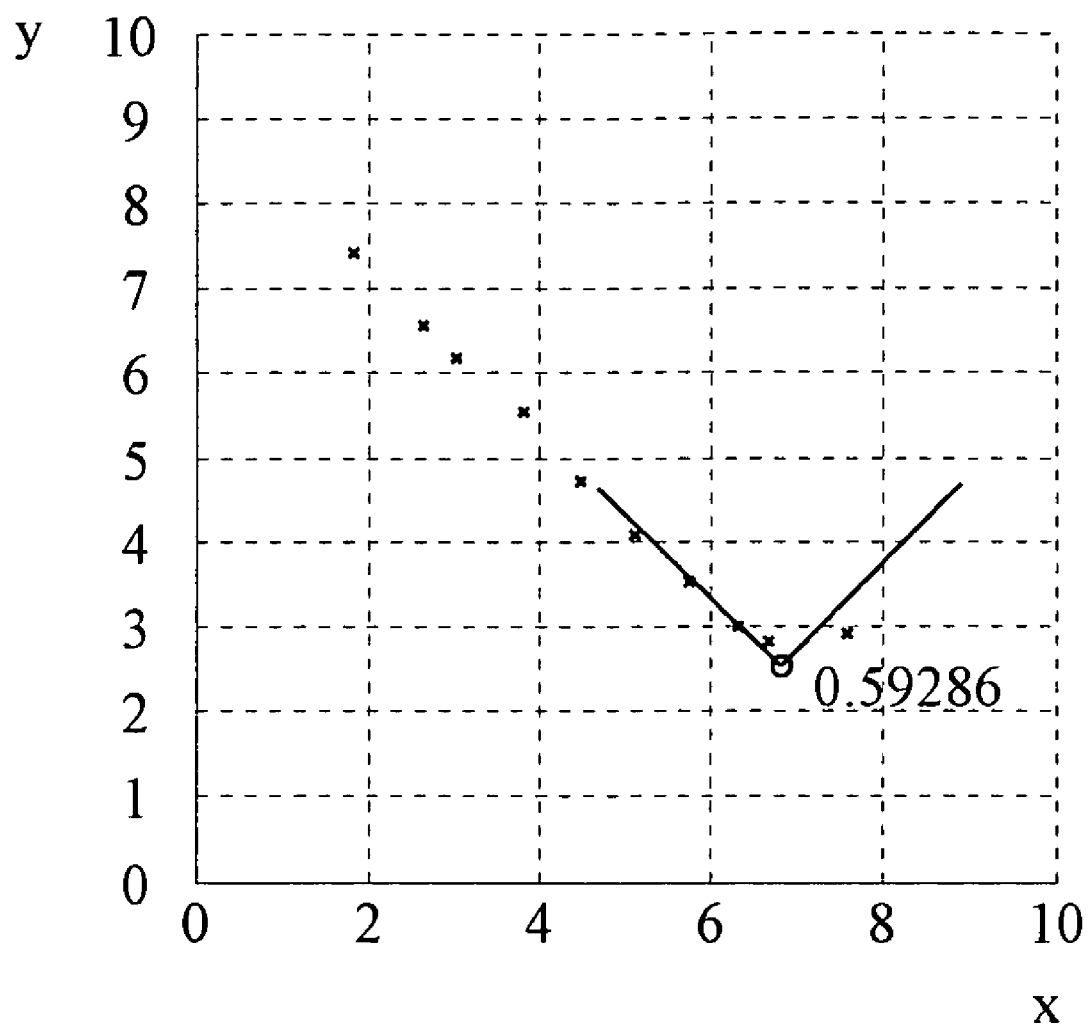

FIGS. 11a and 11b show clusters corresponding to a corner cluster and a straight line, respectively. It is clear from the drawings that the corner error that has been compensated for by the line fitting error shown in FIG. 11a has substantially different values between when the cluster shown in FIG. 11b is a corner and when it is a straight line. If the corner error value calculated in this manner is below 0.2, the object is recognized as a rectangular corner. The number next to the cluster as in FIG. 11 will hereinafter refer to the fitting error value.

Meanwhile, L-shaped template matching is irrelevant to directions, and is robust against severe noise. Since no assumption is made regarding the length of straight lines or the distance between cluster points, this type of matching is more robust than the case of fitting straight lines to range data on the left and right sides of the reference point and applying the requirement of having to be rectangular.

FIG. 12 shows rectangular corner recognition robust against the corner direction and noise.

Figure 12A:
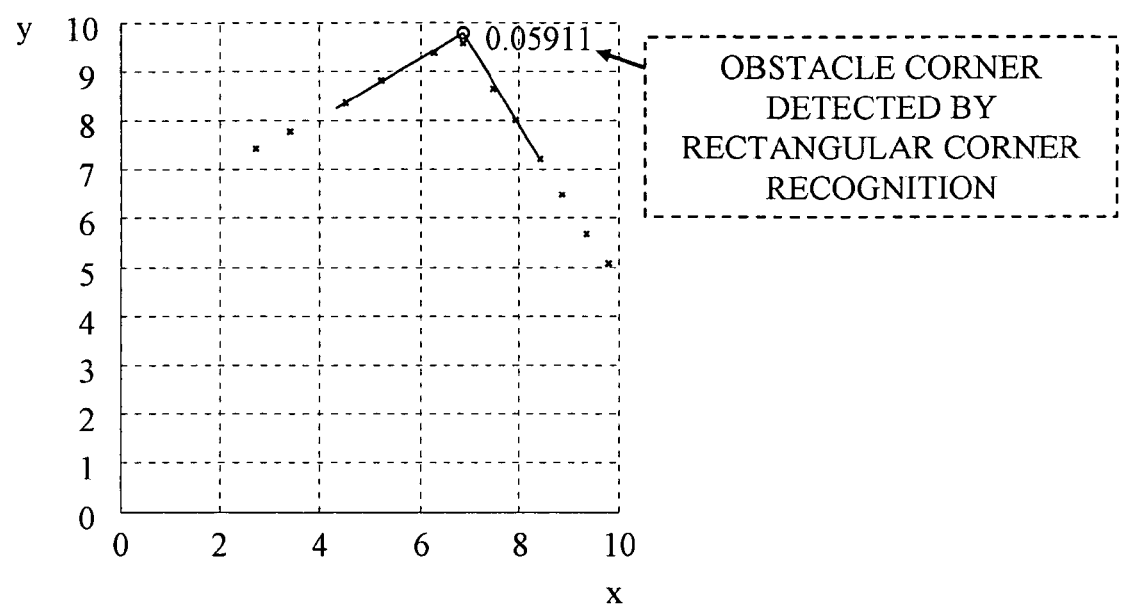
FIG. 12a shows that the line fitting, which consists of an implicit function, is irrelevant to the direction of corners.
Figure 12B:
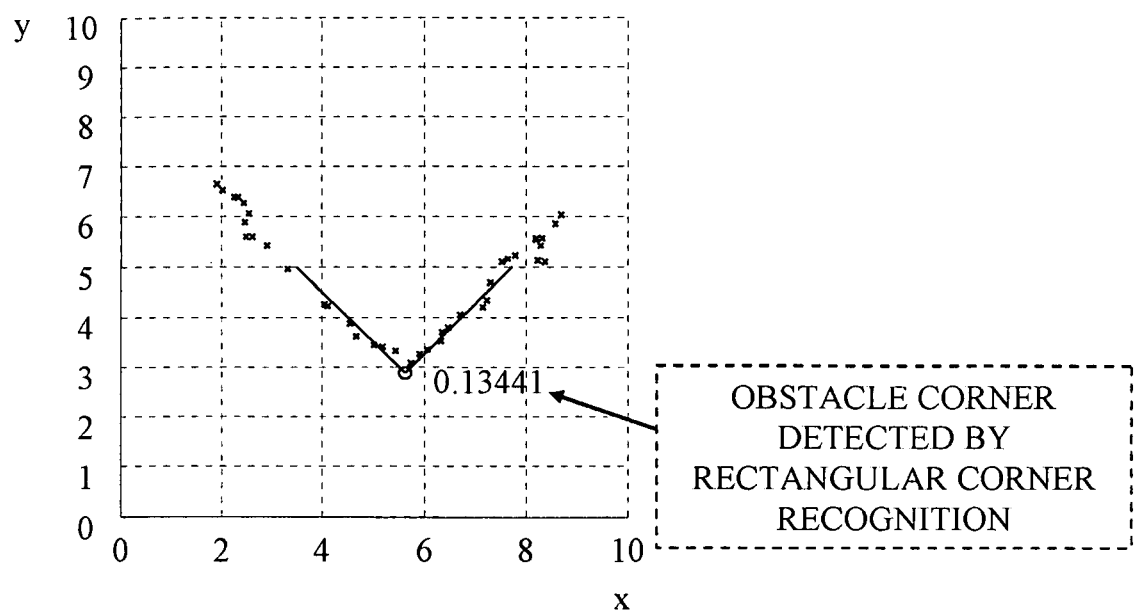
FIG. 12b shows that, even if severe and irregular noise is applied, corners are successfully recognized. If a corner recognized in this manner has a calculated corner error value smaller than 0.2, it corresponds to an obstacle corner having a rectangular shape.

Particularly, FIG. 12a shows that the line fitting, which consists of an implicit function, is irrelevant to the direction of corners. FIG. 12b shows that, even if severe and irregular noise is applied, corners are successfully recognized. If a corner recognized in this manner has a calculated corner error value smaller than 0.2, it corresponds to an obstacle corner having a rectangular shape.

If the calculated corner error value is in the range of 0.2-0.6, round corner recognition is conducted.

FIG. 13 shows a comparison between rectangular corner recognition and round corner recognition when the front or rear surface of a vehicle is round.

Figure 13A:
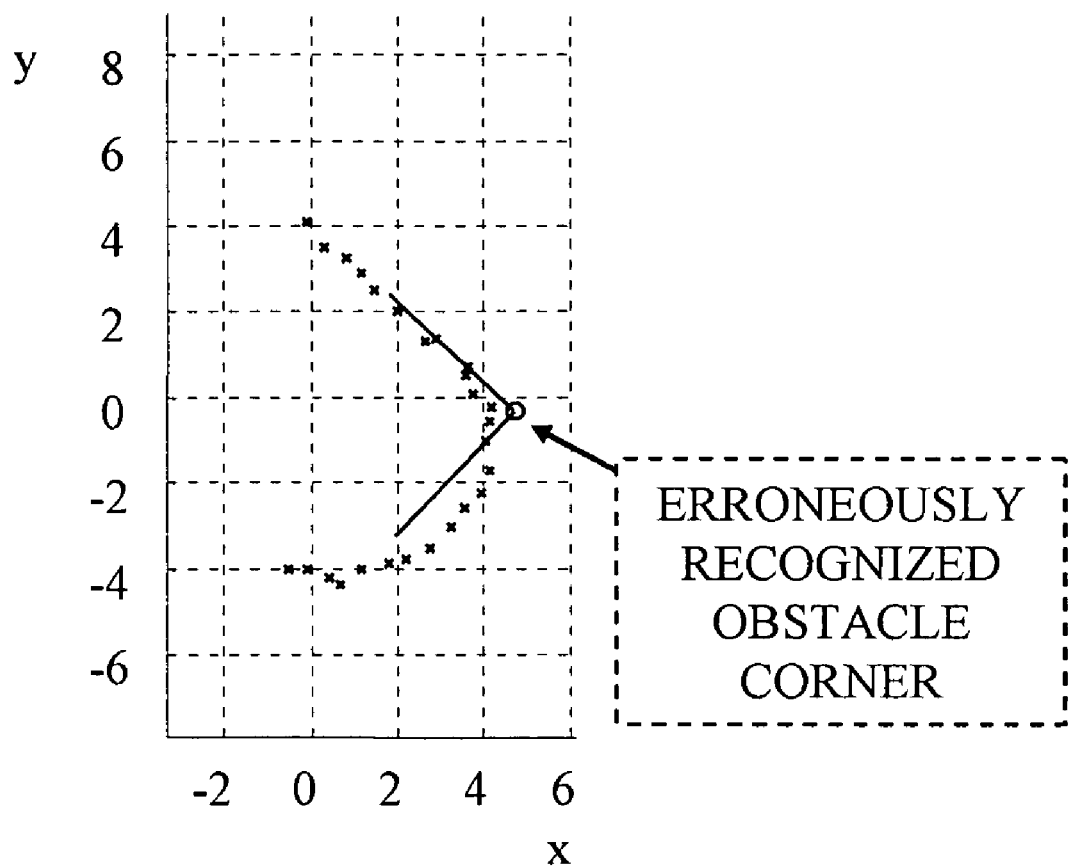
FIG. 13a shows an obstacle corner erroneously recognized by the rectangular corner recognition.
Figure 13B:
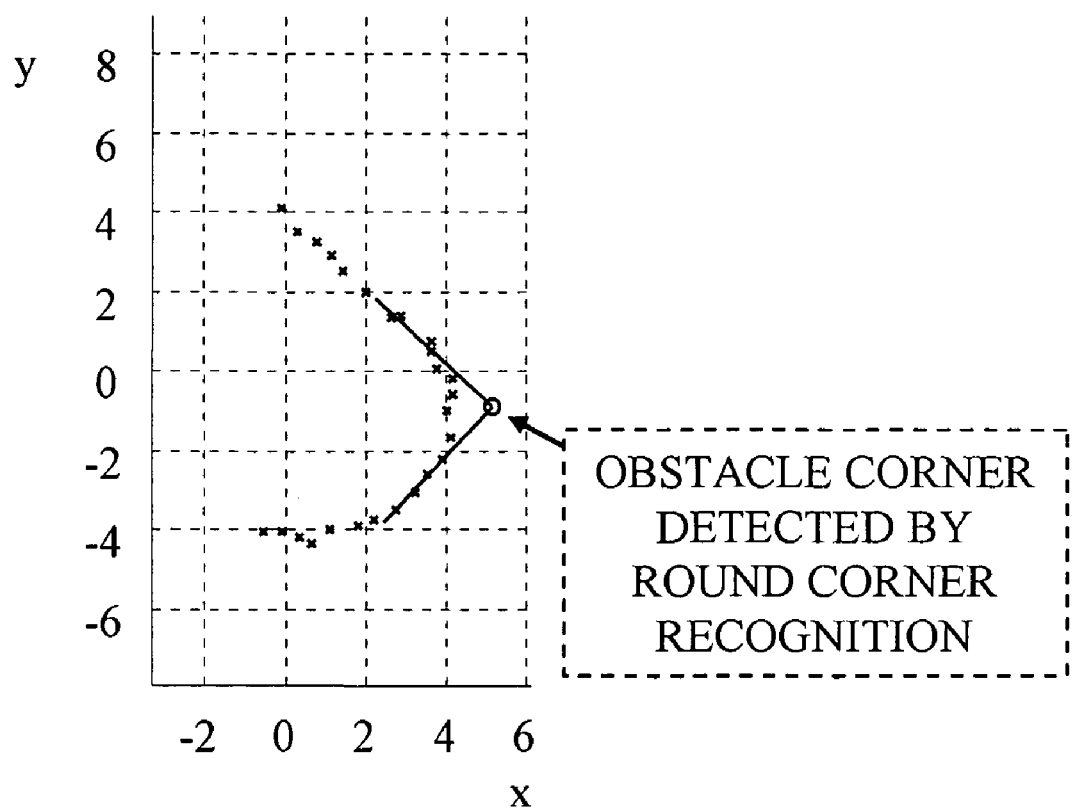
FIG. 13b shows an obstacle corner detected by round corner recognition.

It is clear from FIG. 13a that, when the front or rear of a vehicle is round, rectangular corner recognition causes a large corner error. This is because the assumption that a corner of the vehicle consists of two straight lines joining with each other at the right angle is not valid any more. Therefore, it is assumed instead that corners that have failed to be recognized through the rectangular corner recognition consist of a combination of a straight line and a curved line, and LS fitting is conducted as round corner recognition. In this case, a curved portion is modeled into an elliptical arc. FIG. 13b shows a corner recognized through the round corner recognition.

During the round corner recognition, the result of straight line-arc corner recognition and the result of arc-straight line recognition are compared, and the one with a smaller corner error is recognized as a round corner candidate. A vehicle having a round front or rear surface may look like either a curved line-straight line combination or a straight line-arc combination, depending on the viewing angle. During straight line-arc corner recognition, LS fitting proceeds based on an assumption that a cluster consists of a straight line (left) and an elliptical arc. During arc-straight line corner recognition, LS fitting proceeds based on an assumption that a cluster consists of an elliptical arc (left) and a straight line.

It will be assumed that, in the case of straight line-arc corner recognition, the number of points of a cluster is N, and the index of the reference point is n. Then, points in the index range of 1-n must satisfy the straight line equation $l_1$ defined by Equation (7) below, and points in the index range of n-N must satisfy the ellipse equation $e_2$ defined by Equation (7) below.

$$l_1 : px + qy + r = 0$$

$$e_2 : ax^2 + bxy + cy^2 + dx + ey + f = 0 \quad (7)$$

By applying SVD to points in the index range of 1-n of cluster C, parameters of the straight line equation $l_1$ are obtained, and the sum of algebraic errors squared is defined as a line portion error, $\epsilon_{line\ portion}(C, n)$, as given in Equation (8) below.

$$\varepsilon_{line\ portion}(C, n) = \sum_{i=1}^{n} (px_i + qy_i + r)^2 \quad (8)$$

SDLS (Stable Direct Least Square) ellipse fitting is applied to points in the index range of n-N to obtain parameters of the ellipse equation $e_2$, and the sum of algebraic errors squared is defined as an ellipse portion error, $\epsilon_{ellipse\ portion}(C, n)$, as given in Equation (9) below. Details of the SDLS ellipse fitting are widely known in the art, as disclosed in R. Halif and J. Flusser, "Numerically Stable Direct Least Squares Fitting of Ellipses," Department of Software Engineering, Charles University, Czech Republic, 2000.

$$\varepsilon_{ellipse\ portion}(C, n) = \sum_{i=n}^{N} (ax_i^2 + bx_i y_i + cy_i^2 + dx_i + ey_i + f)^2 \quad (9)$$

The line-curve fitting error regarding the $n^{th}$ point of cluster C, i.e. $\epsilon_{line-curve\ corner}(C, n)$, is defined as the sum of the line portion error and the ellipse portion error, as given in Equation (10) below.

$$\epsilon_{line-curve\ corner}(C,n) = \epsilon_{line\ portion}(C,n) + \epsilon_{ellipse\ portion}(C,n) \quad (10)$$

The line-curve fitting error is obtained with regard to the $5^{th}$ to $(N-5)^{th}$ points of the cluster, and a corner having a point with the smallest value as its vertex is recognized as the straight line-arc corner candidate of cluster C. The line-curve fitting error of a point having the smallest line-curve fitting error is divided by a line fitting error $\epsilon_{line}(C)$ obtained based on an assumption that every point constitutes a straight line, and is normalized. The resulting value is defined as the corner error of cluster C, i.e. corner_error(C), as given in Equation (11) below.

$$corner\_error(C) = \frac{\min_n \varepsilon_{line-curve\ corner}(C, n)}{\varepsilon_{line}(C)} \quad (11)$$

It is assumed in the case of arc-straight line corner recognition that, among N points, those in the range of 1-n satisfy the ellipse equation $e_1$, and those in the range of n-N satisfy the ellipse equation $l_2$, as defined by Equation (12) below.

$$e_1 : ax^2 + bxy + cy^2 + dx + ey + f = 0$$

$$l_2 : px + qy + r = 0 \quad (12)$$

After SDLS ellipse fitting of points in the range of 1-n, the sum of algebraic errors squared regarding parameters of the ellipse is defined as an ellipse portion error, i.e. $\epsilon_{ellipse\ portion}(C, n)$, as given in Equation (13) below.

$$\varepsilon_{ellipse\ portion}(C, n) = \sum_{i=1}^{n}(ax_i^2 + bx_iy_i + cy_i^2 + dx_i + ey_i + f)^2 \quad (13)$$

After line-fitting points in the range of n-N by using SVD, the sum of algebraic errors squared regarding parameters of the straight line is defined as a line portion error, i.e. $\epsilon_{line\ portion}(C, n)$, as given in Equation (14) below.

$$\varepsilon_{line\ portion}(C, n) = \sum_{i=n}^{N}(px_i + qy_i + r)^2 \quad (14)$$

The curve-line fitting error regarding the $n^{th}$ point of cluster C, i.e. $\epsilon_{line-curve\ corner}(C, n)$, is defined as the sum of the ellipse portion error and the line portion error, as given in Equation (15) below.

$$\epsilon_{curve-line\ corner}(C, n) = \epsilon_{ellipse\ portion}(C, n) + \epsilon_{line\ portion}(C, n) \quad (15)$$

The curve-line fitting error regarding the $5^{th}$ to $(N-5)^{th}$ points of the cluster is obtained, and a corner having a point with the smallest value as its vertex is recognized as an arc-straight line corner candidate of cluster C. The smallest value of curve-line fitting error is divided by a line fitting error obtained on an assumption that every point constitutes a straight line, and is normalized. The resulting value is defined as the corner error of cluster C, i.e. corner_error(C), as given in Equation (16) below.

$$corner\_error(C) = \frac{\min_n \varepsilon_{line-curve\ corner}(C, n)}{\varepsilon_{line}(C)} \quad (16)$$

In the case of round corner recognition, straight line-arc corner recognition is applied to cluster C to obtain a line-curve corner error as defined by Equation (11), and arc-straight line corner recognition is applied to obtain a curve-line corner error as defined by Equation (16). The fitting result of one of thus obtained line-curve corner error and the curve-line corner error, which has a smaller value, is regarded as the fitting result of cluster C. If corner_error(C) is below the threshold (e.g. 0.2), the object is recognized as a cluster having a round corner. If not, the object is regarded irrelevant to parking, and is ignored.

When the object is regarded as a cluster having a round corner, $d_1$ is set to extend toward the end point of the straight line from the vertex, and $d_2$ is set to extend toward the center of the ellipse from the vertex in parallel with the long axis of the ellipse. The vertex of the obstacle corner obtained in this case is set by obtaining the point of intersection between the straight line and the long axis of the ellipse and moving it along the short axis of the ellipse as much as the short-axis radius.

FIG. 14 shows the result of round corner recognition in the case of an arc-straight line corner.

Figure 14A:
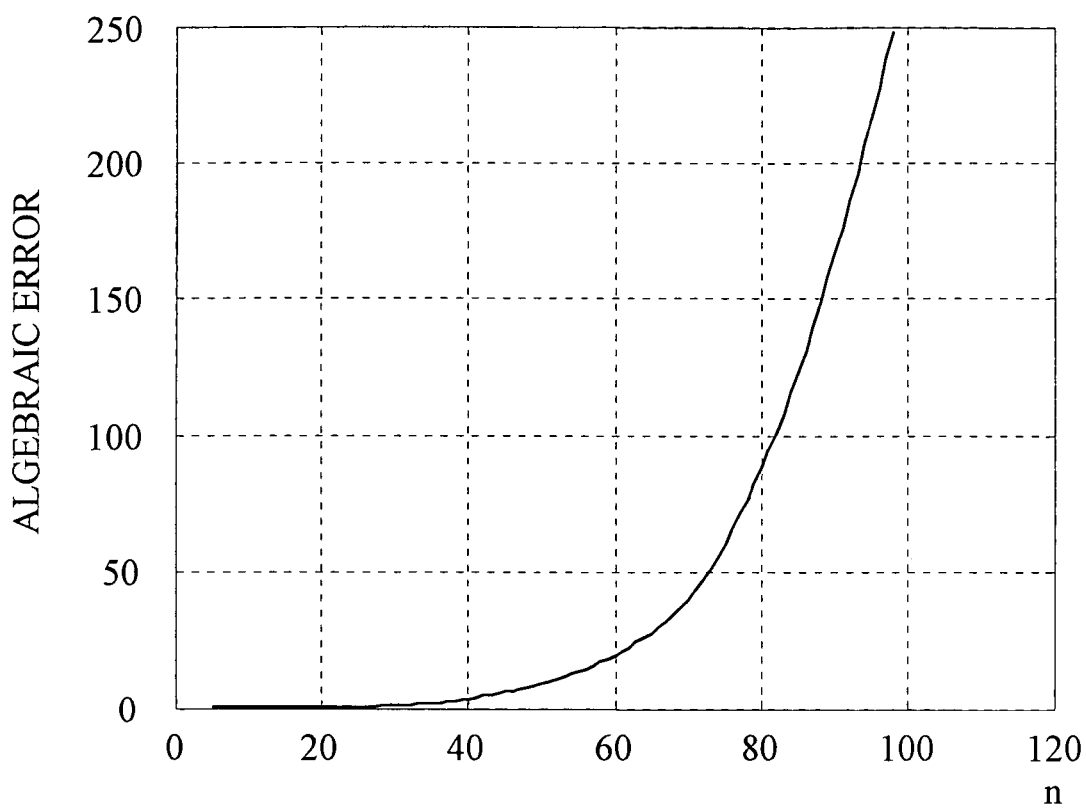
FIG. 14a shows that the line portion error of line curve fitting increases as n increases and FIG. 14b shows that the ellipse portion error of line-curve fitting decreases as n increases.
Figure 14B:
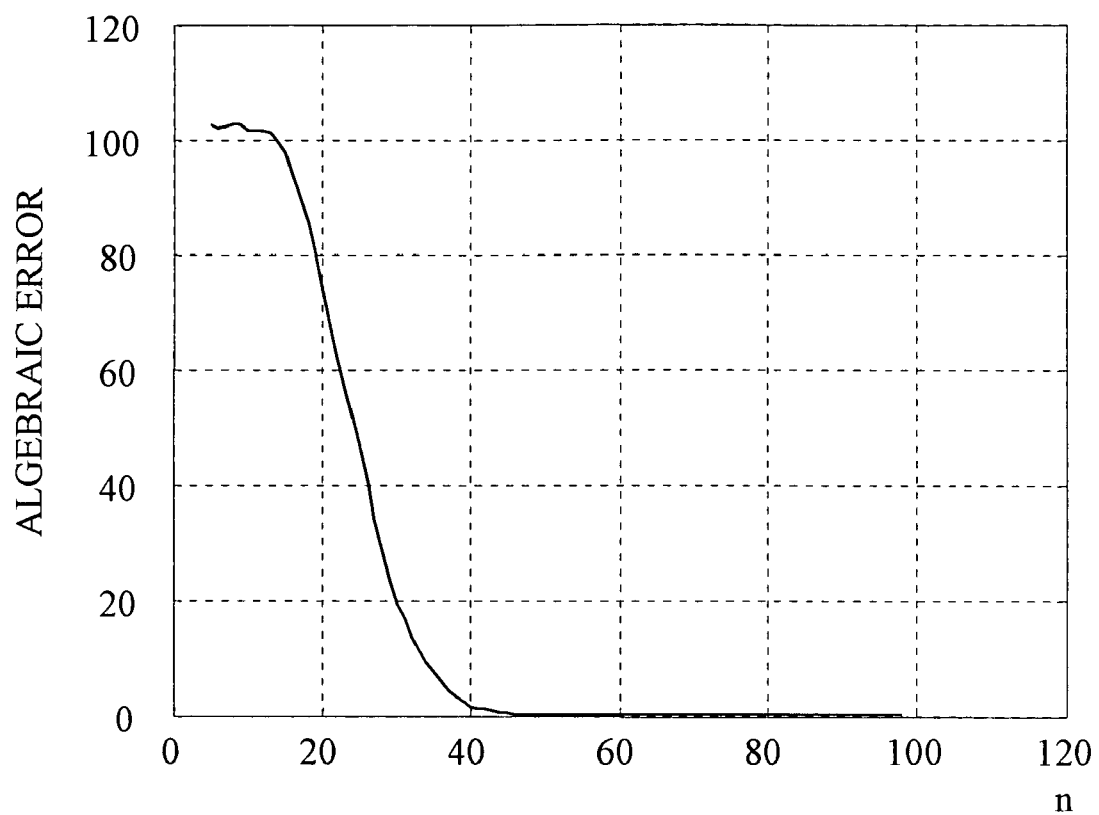
Figure 14C:
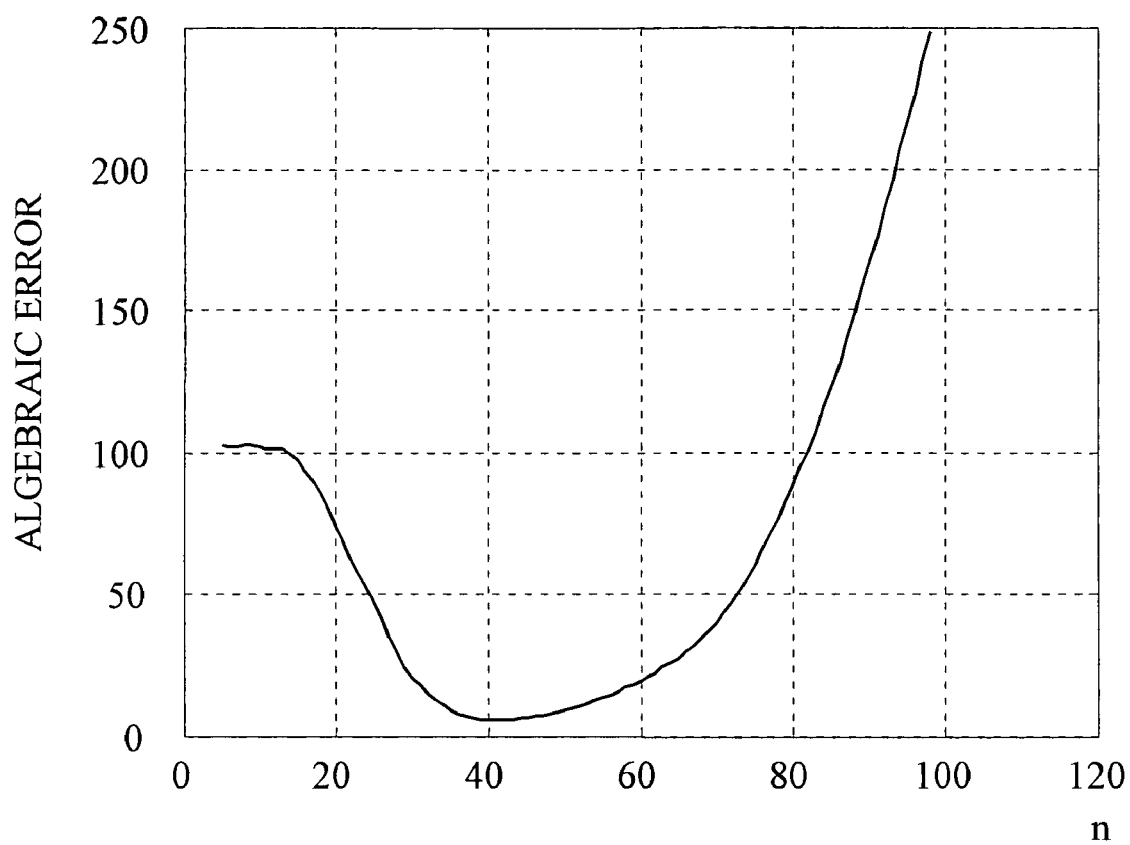
FIG. 14c shows the line-curve fitting error, say, the line portion error of line-curve fitting plus the ellipse portion error of line-curve fitting.
Figure 14D:
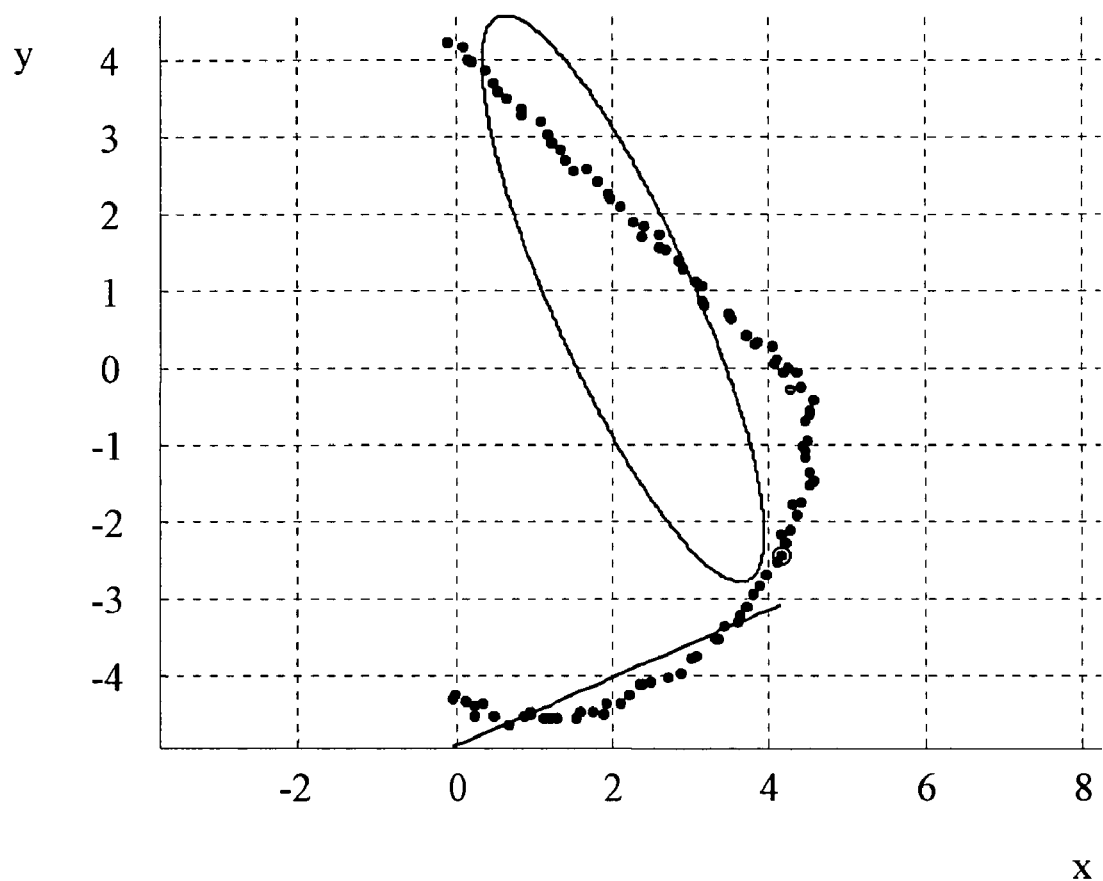
FIG. 14d shows an optimum line-curve fitting result.

Particularly, FIG. 14a shows the line portion error of line-curve fitting; FIG. 14b shows the ellipse portion error of line-curve fitting; FIG. 14c shows the line-curve fitting error; and FIG. 14d shows an optimum line-curve fitting result.

FIG. 14a shows that the line portion error of line-curve fitting increases as n increases and FIG. 14b shows that the ellipse portion error of line-curve fitting decreases as n increases.

FIG. 14c shows the line-curve fitting error, say, the line portion error of line-curve fitting plus the ellipse portion error of line-curve fitting. Therefore, we can find n in case that the line-curve fitting error has the smallest value. FIG. 14d shows an optimum line-curve fitting result.

Figure 14E:
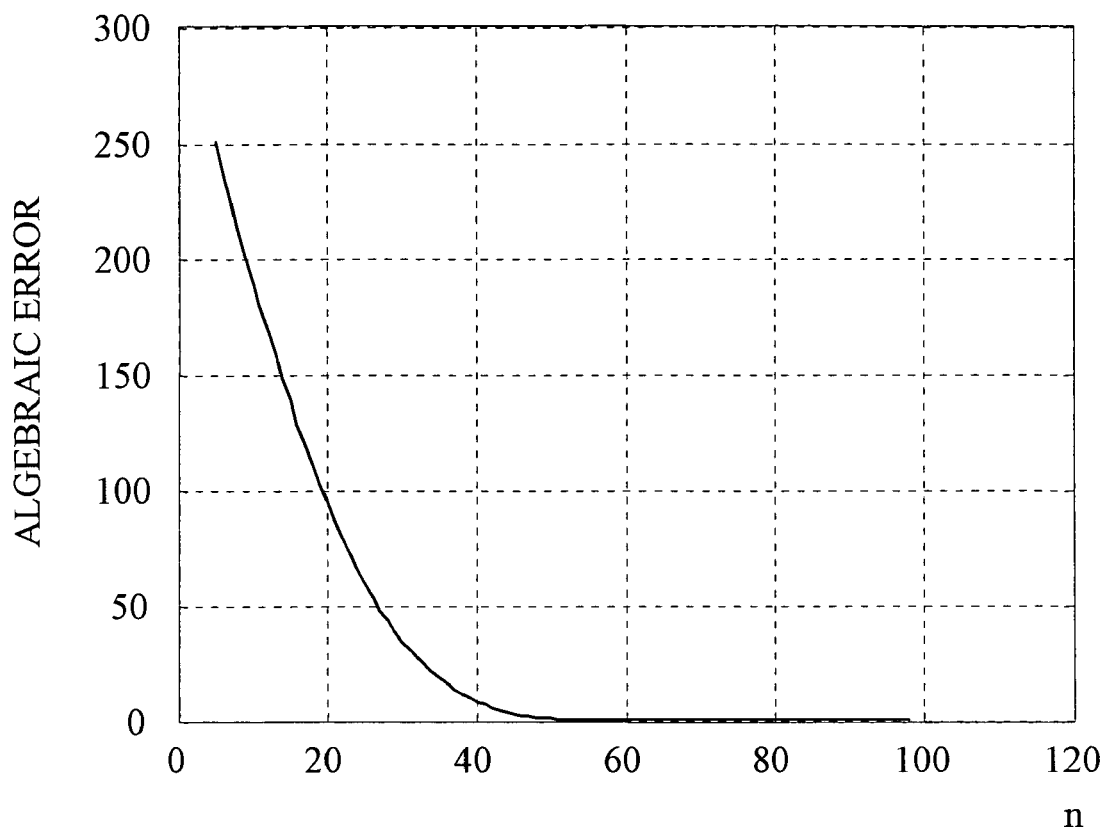
FIG. 14e shows the line portion error of curve-line fitting.
Figure 14F:
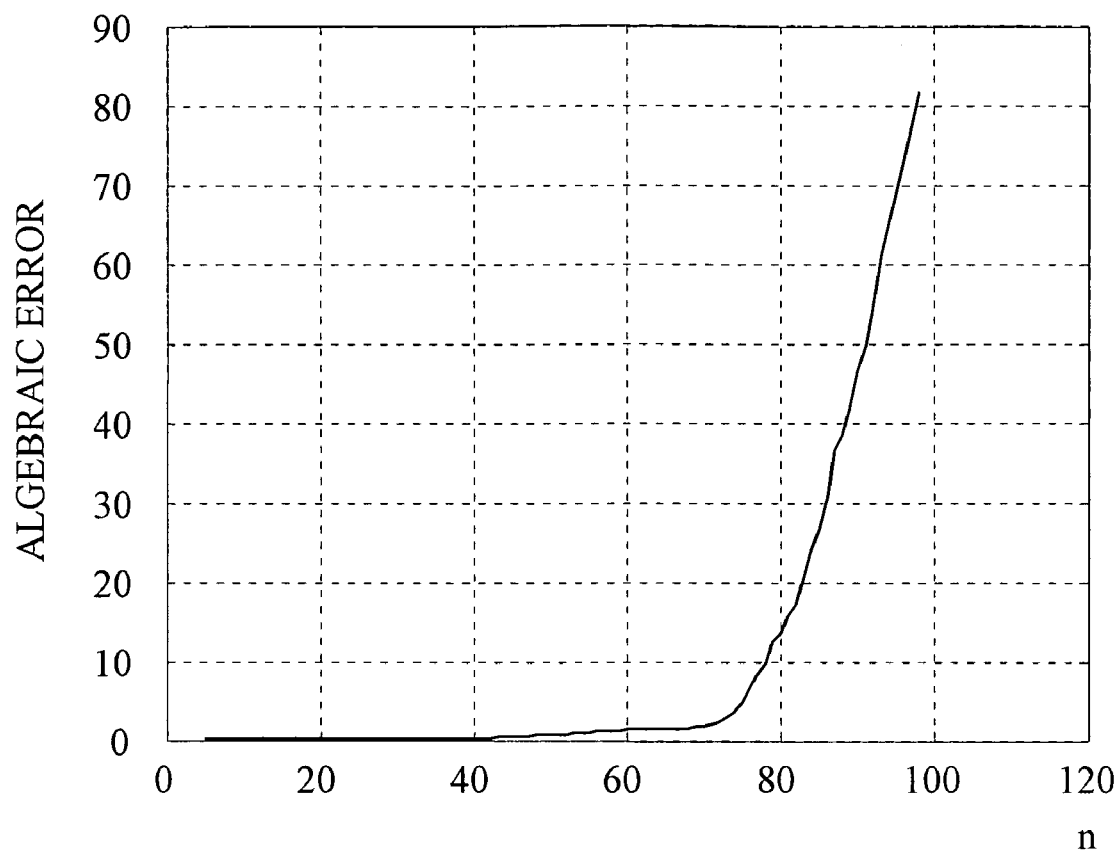
FIG. 14f shows the ellipse portion error of curve line fitting.
Figure 14G:
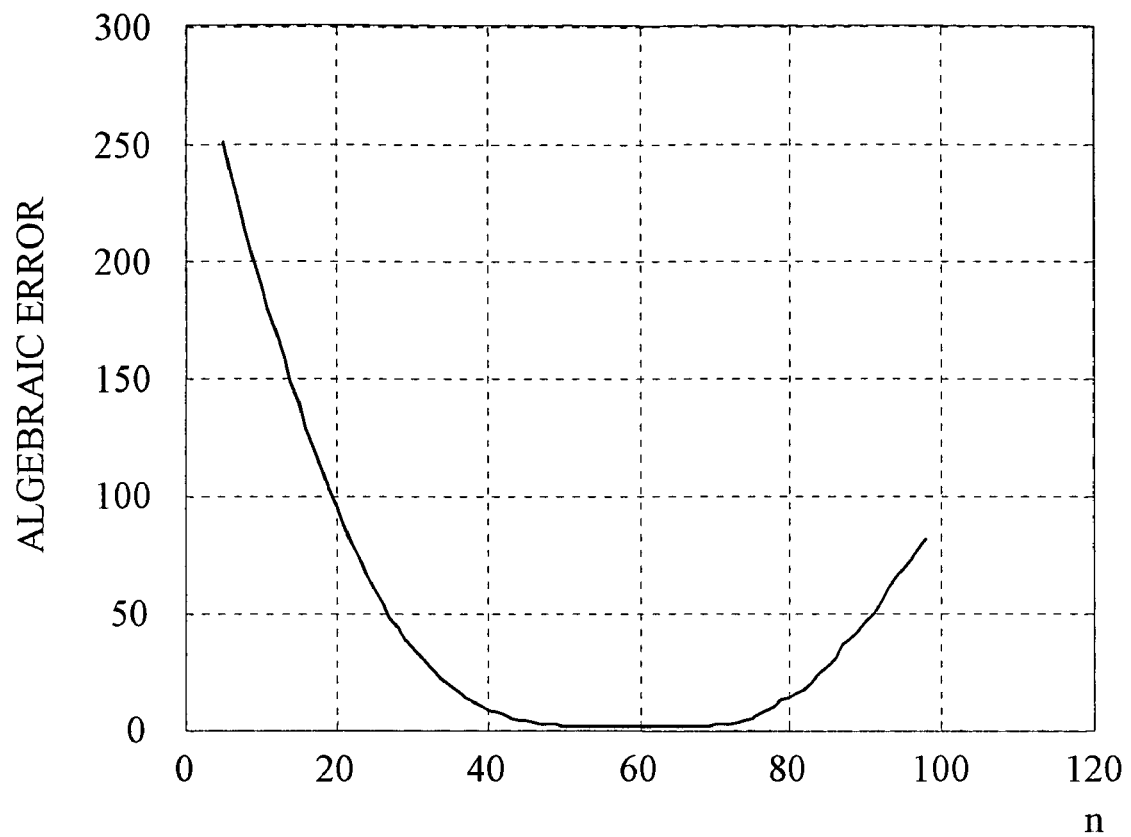
FIG. 14g shows the curve-line fitting error.
Figure 14H:
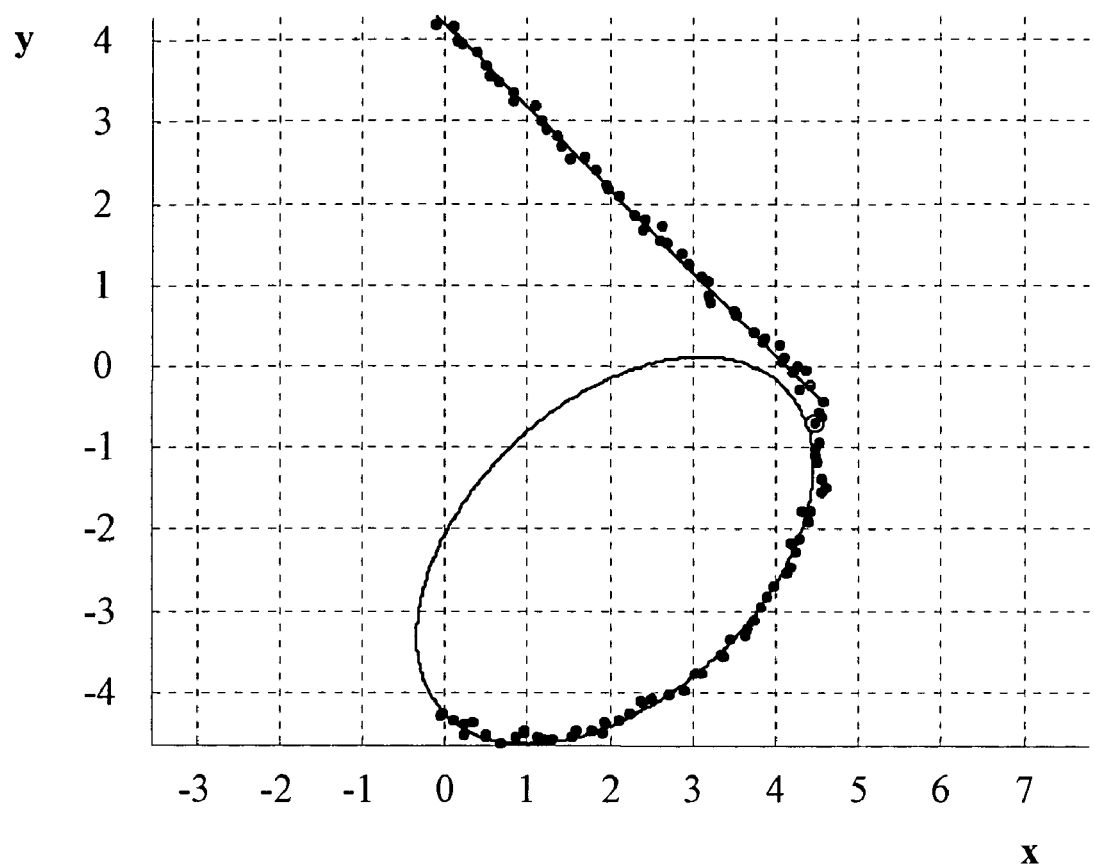
FIG. 14h shows an optimum curve-line fitting result.

FIG. 14e shows the line portion error of curve-line fitting; FIG. 14f shows the ellipse portion error of curve-line fitting; FIG. 14g shows the curve-line fitting error; and FIG. 14h shows an optimum curve-line fitting result.

FIG. 14e shows that the line portion error of curve-line fitting decreases as n increases and FIG. 14f shows that the ellipse portion error of curve-line fitting increases as n increases.

FIG. 14g shows the curve-line fitting error, say, the line portion error of curve-line fitting plus the ellipse portion error of curve-line fitting. Therefore, we can find n in case that the curve-line fitting error has the smallest value. FIG. 14h shows an optimum curve-line fitting result.

Figure 14I:
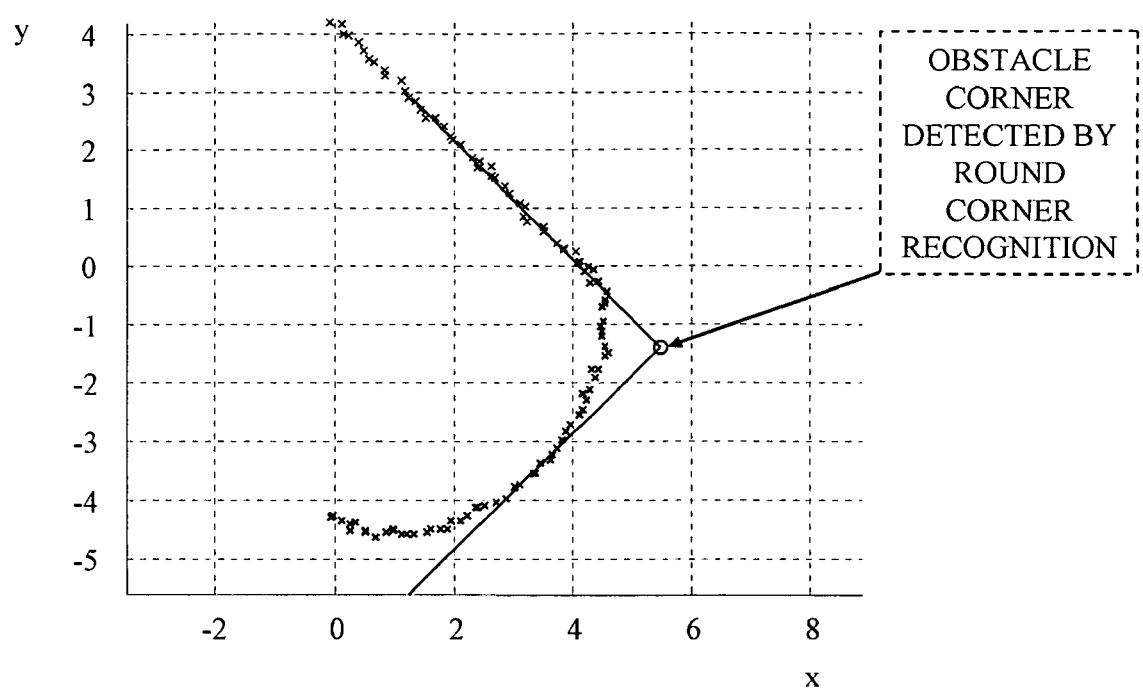
FIG. 14i shows a finally recognized obstacle corner.

FIG. 14i shows a finally recognized obstacle corner.

It is clear from a comparison between FIGS. 14c and 14g that the smallest value of the curve-line fitting error is smaller than the smallest value of the line-curve fitting error, therefore, the corner error of curve-line fitting is smaller than the corner error of line-curve fitting. Therefore, the cluster has been recognized as a cluster having a round corner in an arc-straight line shape as shown in FIG. 14i. This conforms to the optimum fitting results shown in FIGS. 14d and 14h.

FIG. 15 shows the result of round corner recognition in the case of a straight line-arc corner.

Figure 15A:
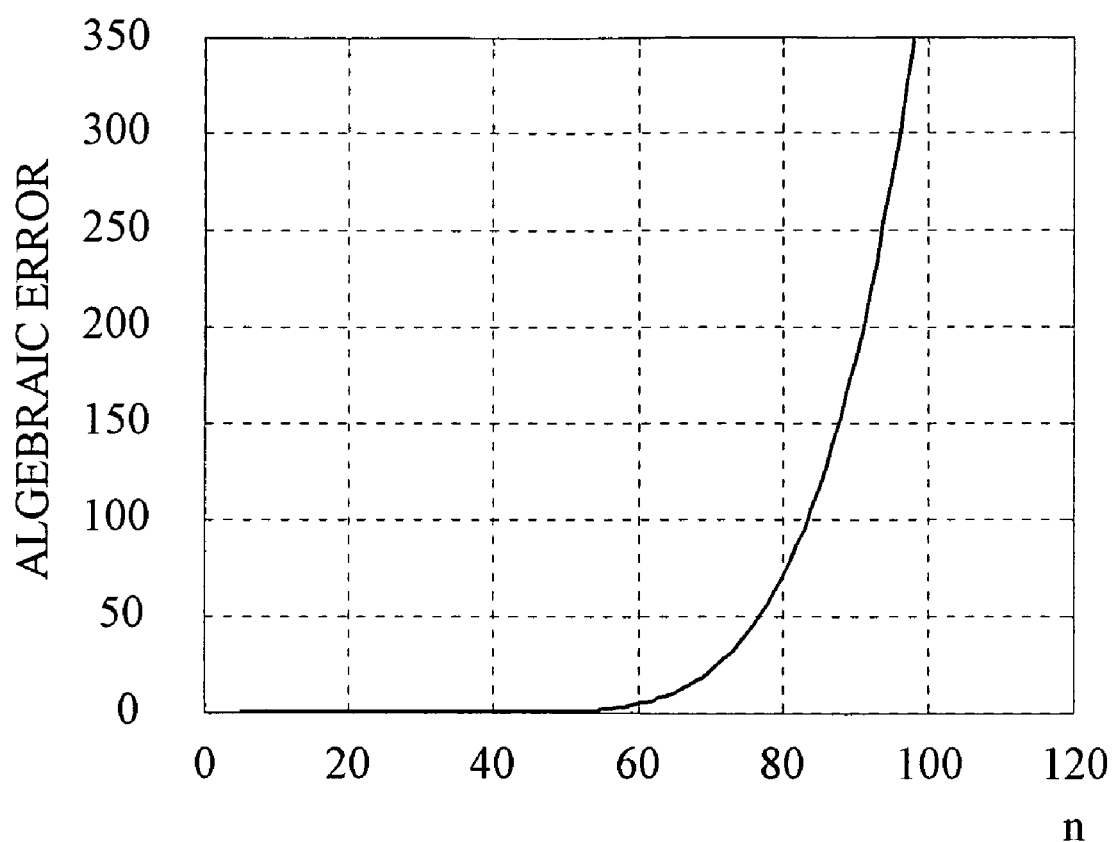
FIG. 15a shows that the line portion error of line-25 curve fitting increases as n increases and FIG. 15b shows that the ellipse portion error of line-curve fitting decreases as n increases.
Figure 15B:
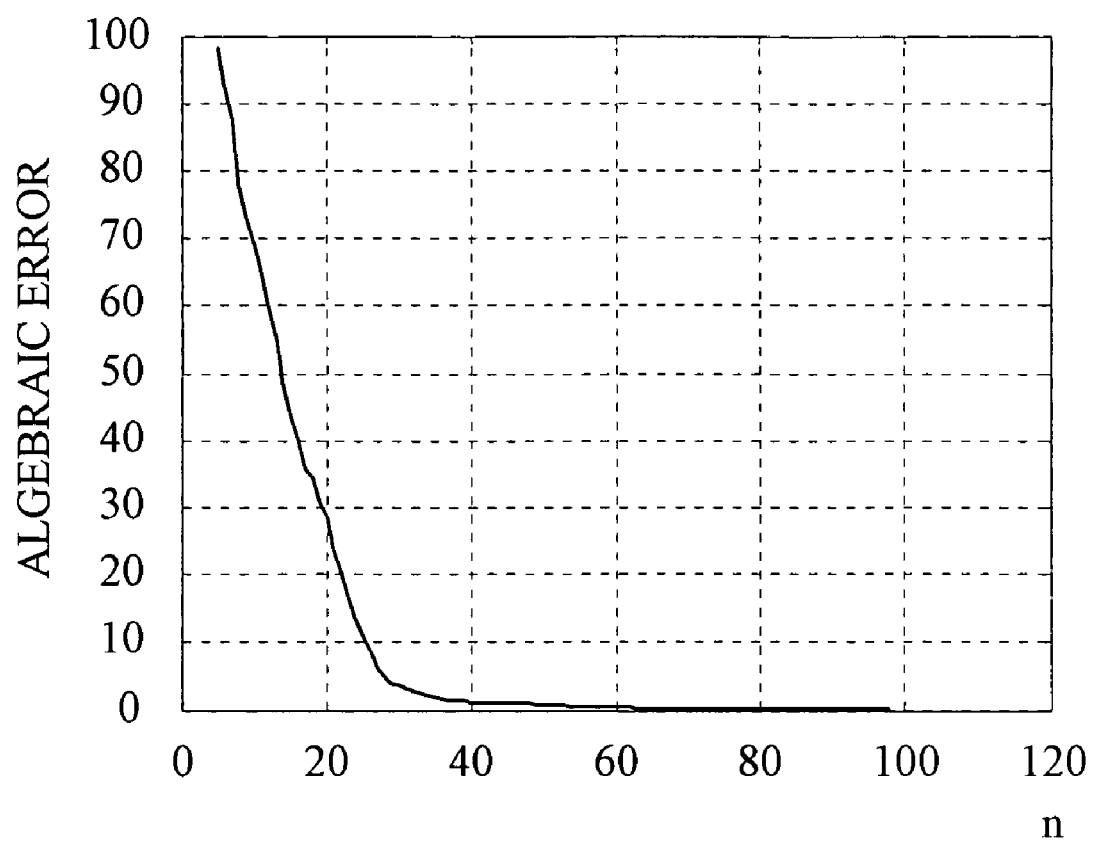
Figure 15C:
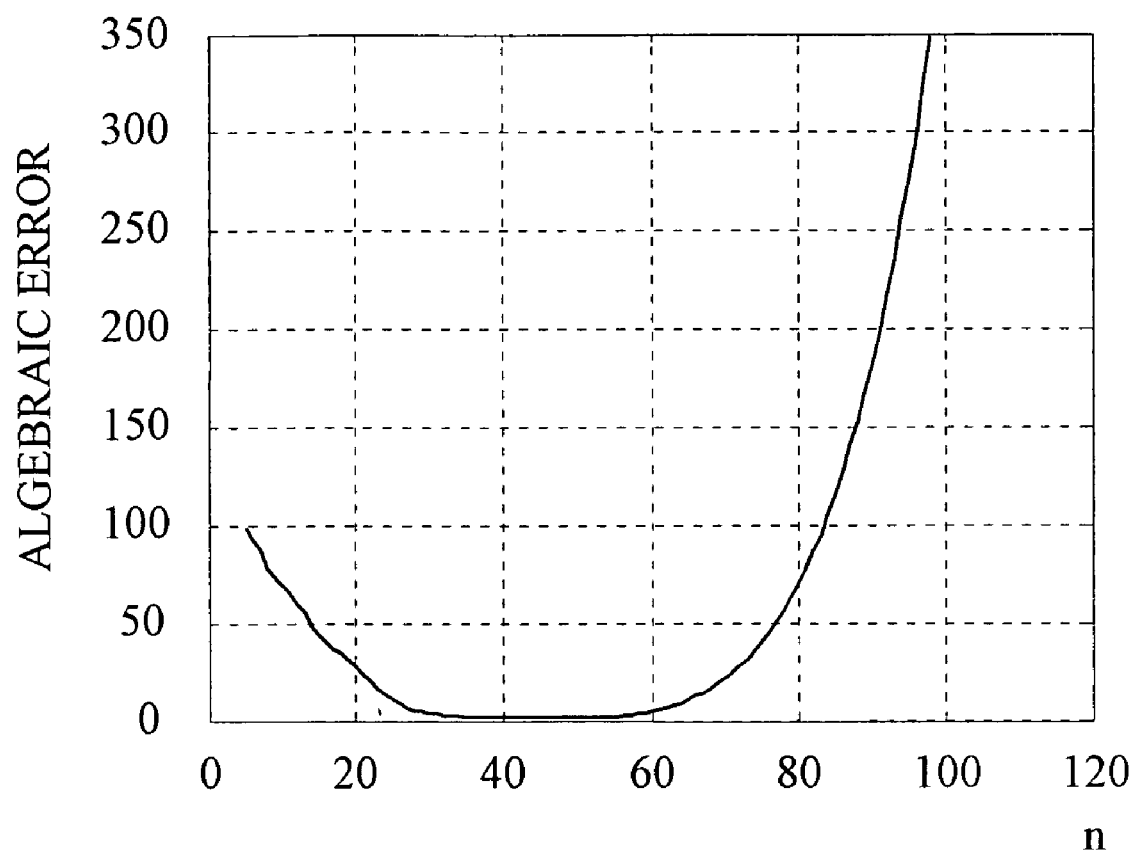
FIG. 15c shows the line-curve fitting error, say, the line portion error of line-curve fitting plus the ellipse portion error of line-curve fitting.
Figure 15D:
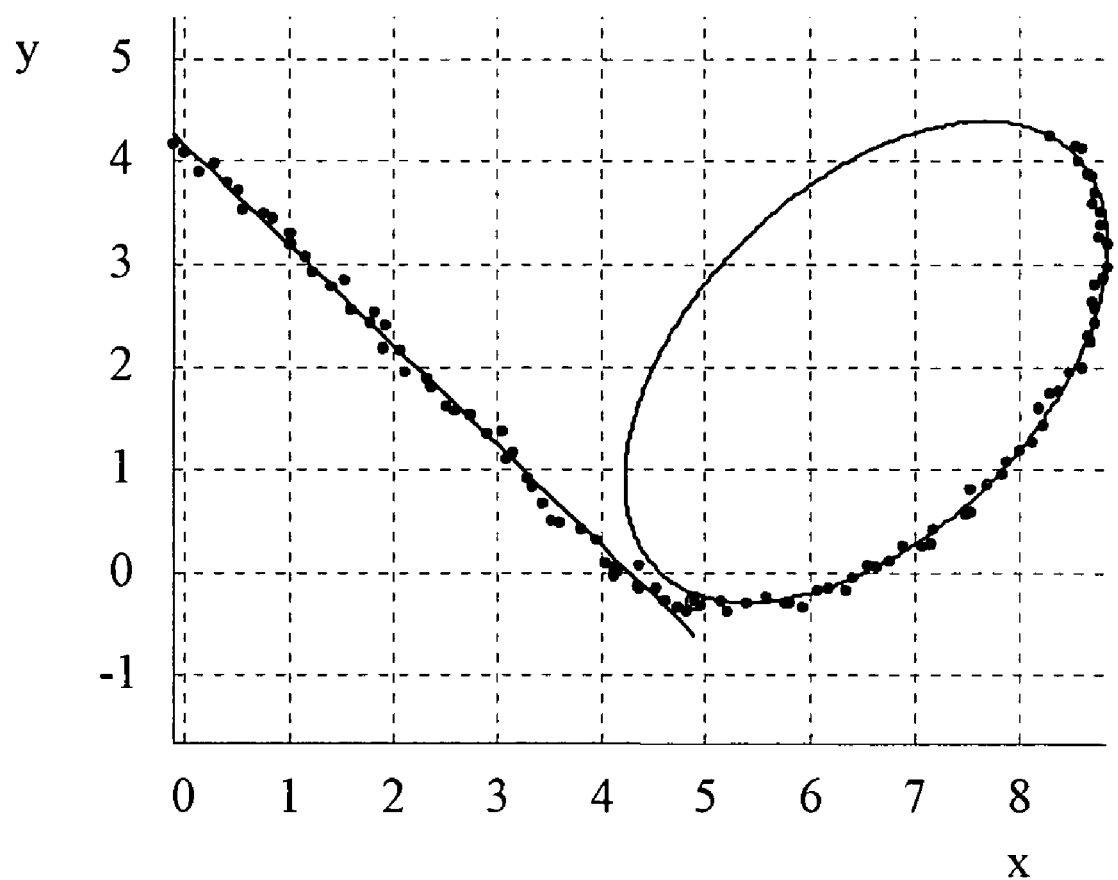
FIG. 15d shows an optimum line-curve fitting result.

Particularly, FIG. 15a shows the line portion error of line-curve fitting; FIG. 15b shows the ellipse portion error of line-curve fitting; FIG. 15c shows the line-curve fitting error; and FIG. 15d shows an optimum line-curve fitting result.

FIG. 15a shows that the line portion error of line-curve fitting increases as n increases and FIG. 15b shows that the ellipse portion error of line-curve fitting decreases as n increases.

FIG. 15c shows the line-curve fitting error, say, the line portion error of line-curve fitting plus the ellipse portion error of line-curve fitting. Therefore, we can find n in case that the line-curve fitting error has the smallest value. FIG. 15d shows an optimum line-curve fitting result.

Figure 15E:
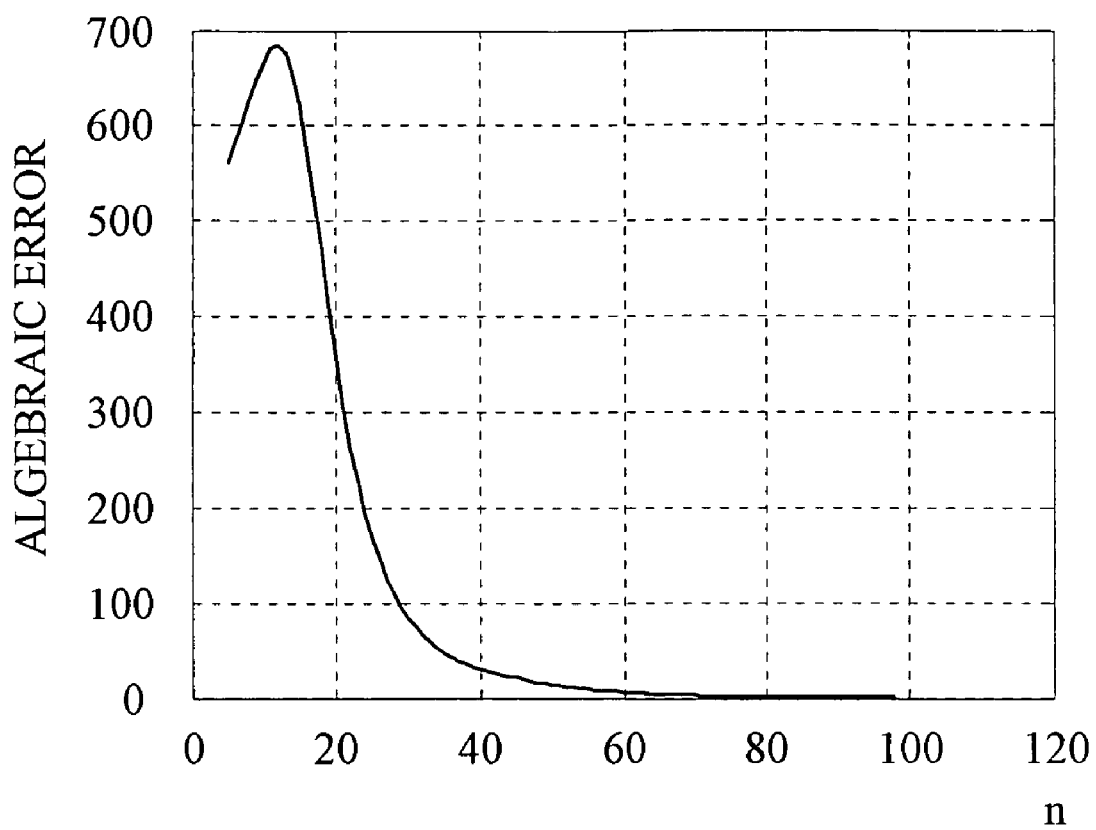
FIG. 15e shows the line portion error of curve-line fitting.
Figure 15F:
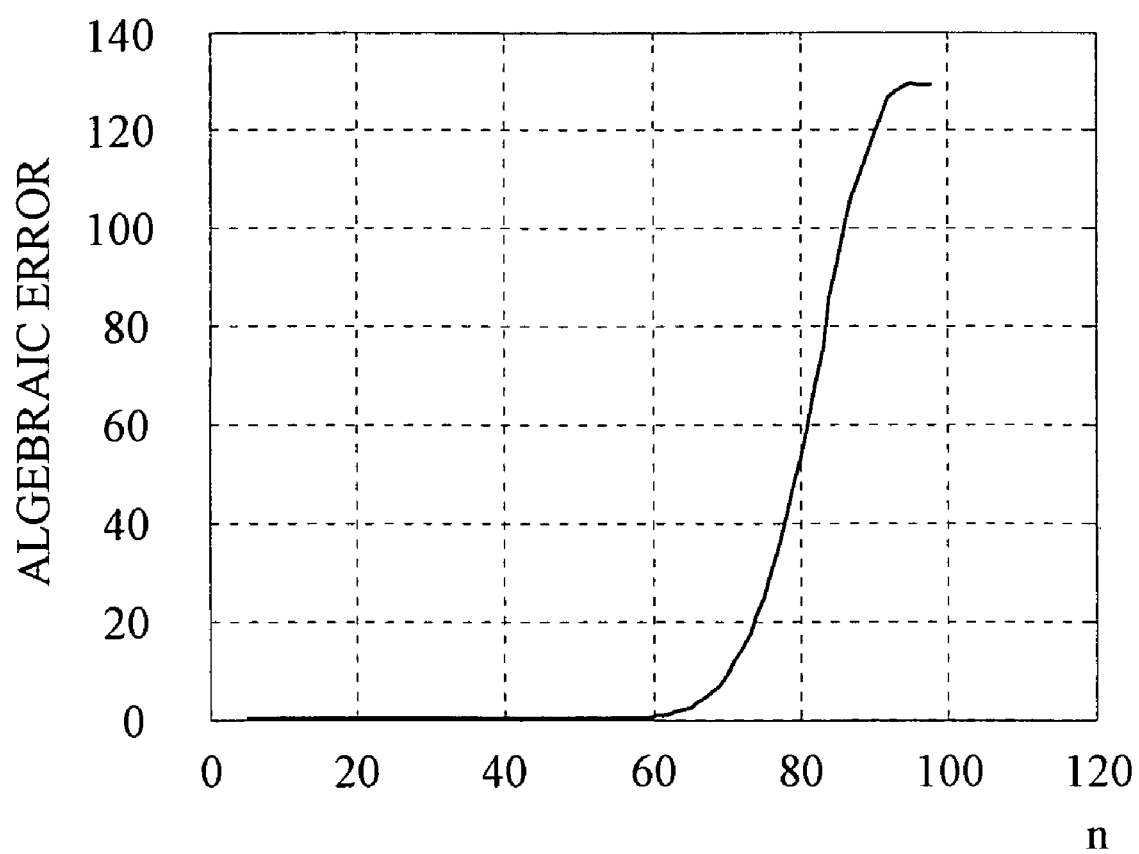
FIG. 15f shows the ellipse portion error of curve-line fitting.
Figure 15G:
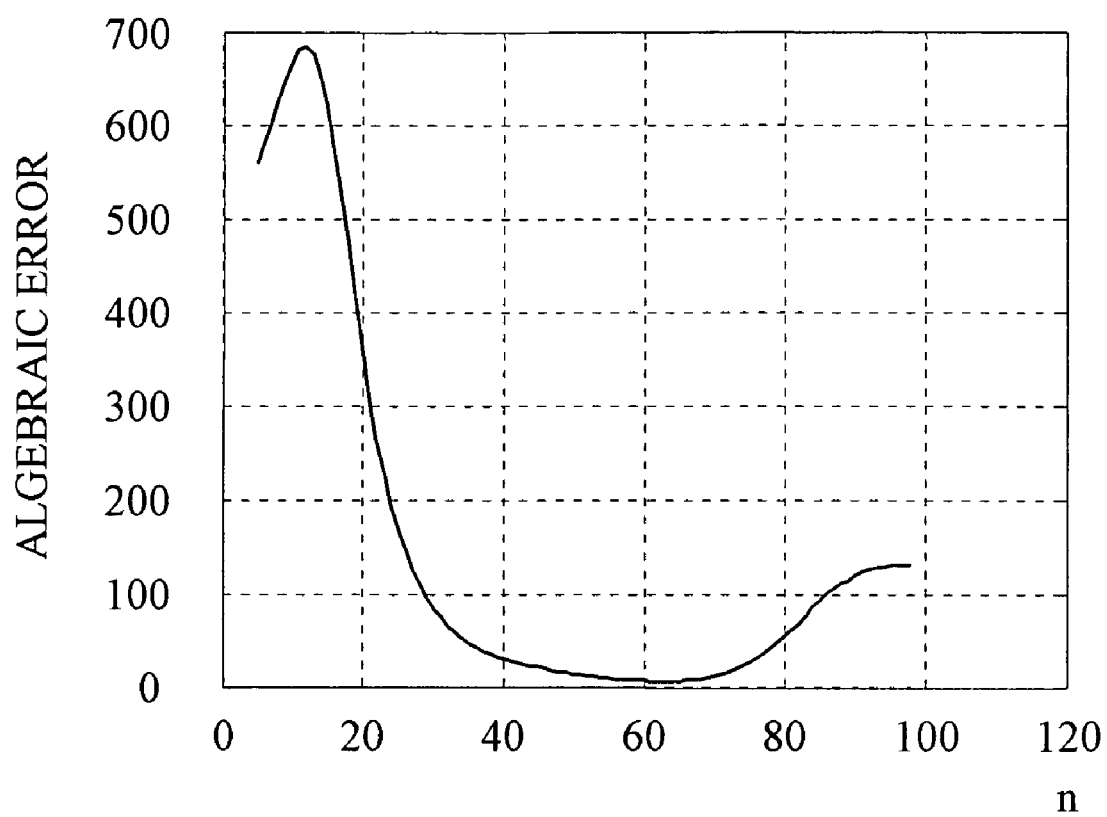
FIG. 15g shows the curve-line fitting error.
Figure 15H:
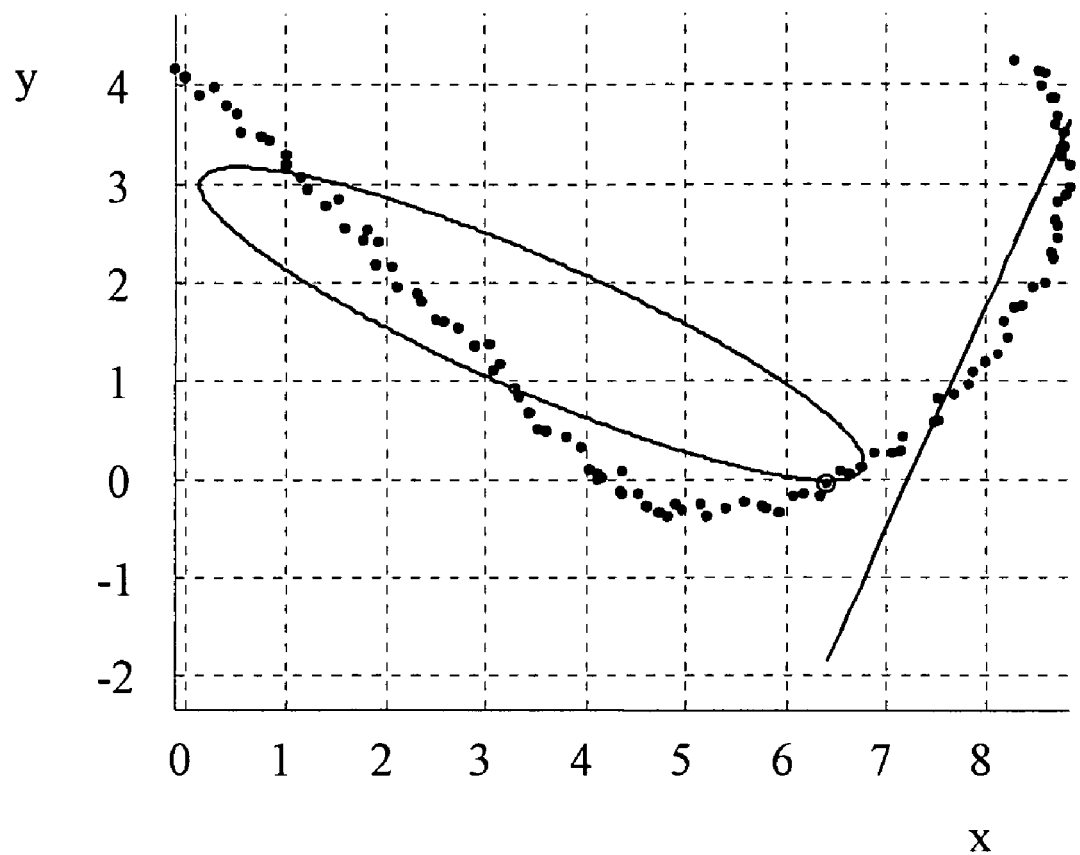
FIG. 15h shows an optimum curve-line fitting result.

FIG. 15e shows the line portion error of curve-line fitting; FIG. 15f shows the ellipse portion error of curve-line fitting; FIG. 15g shows the curve-line fitting error; and FIG. 15h shows an optimum curve-line fitting result.

FIG. 15e shows that the line portion error of curve-line fitting decreases as n increases and FIG. 15f shows that the ellipse portion error of curve-line fitting increases as n increases.

FIG. 15g shows the curve-line fitting error, say, the line portion error of curve-line fitting plus the ellipse portion error of curve-line fitting. Therefore, we can find n in case that the curve-line fitting error has the smallest value. FIG. 15h shows an optimum curve-line fitting result.

Figure 15I:
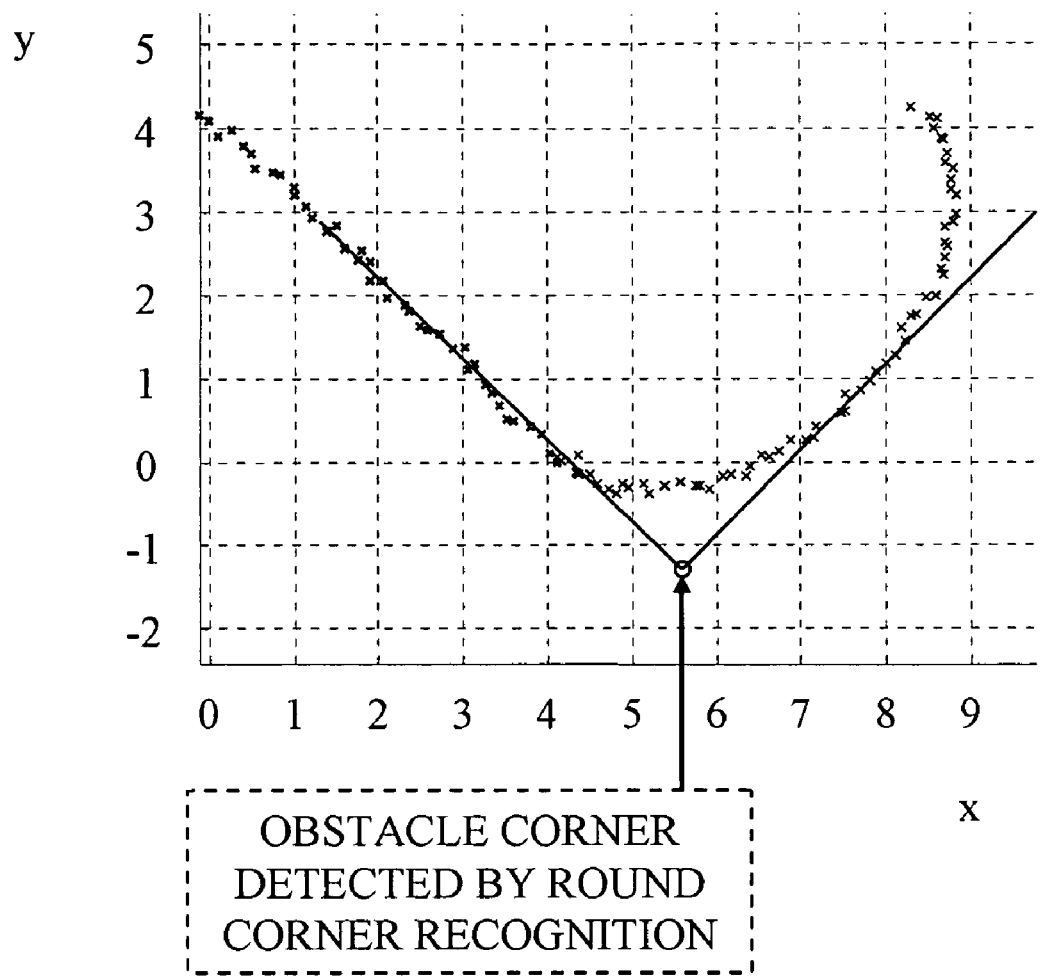
FIG. 15i shows a finally recognized obstacle corner.

FIG. 15i shows a finally recognized obstacle corner.

It is clear from a comparison between FIGS. 15c and 15g that the smallest value of the line-curve fitting error is smaller than the smallest value of the curve-line fitting error, therefore, the corner error of line-curve fitting is smaller than the corner error of curve-line fitting. Therefore, the cluster has been recognized as a cluster having a round corner in a straight line-arc shape as shown in FIG. 15i. This conforms to the optimum fitting results shown in FIGS. 15d and 15h.

FIG. 16 shows the result of applying round corner recognition to actual range data obtained from a scanning laser radar.

Figure 16A:
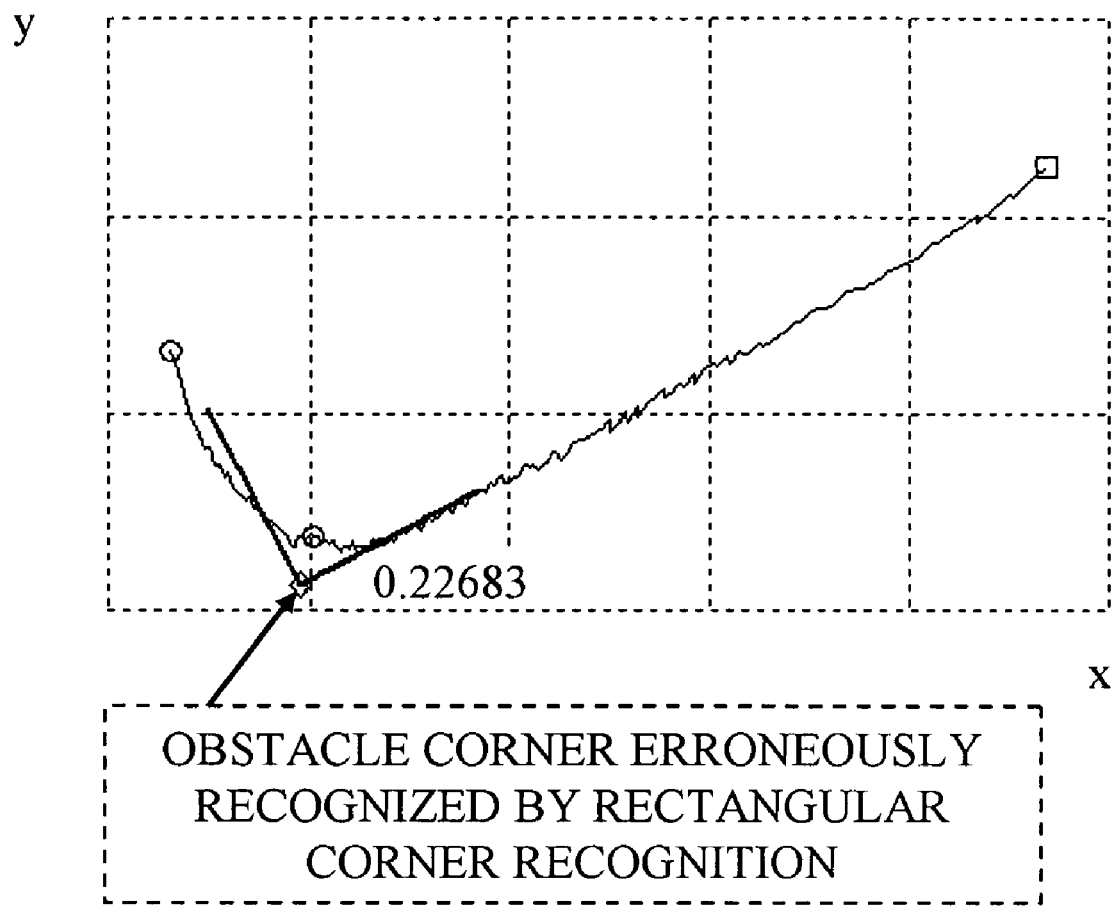
FIG. 16a shows the result of recognizing a corner by using rectangular corner recognition with regard to a cluster of the scanning laser radar.
Figure 16B:
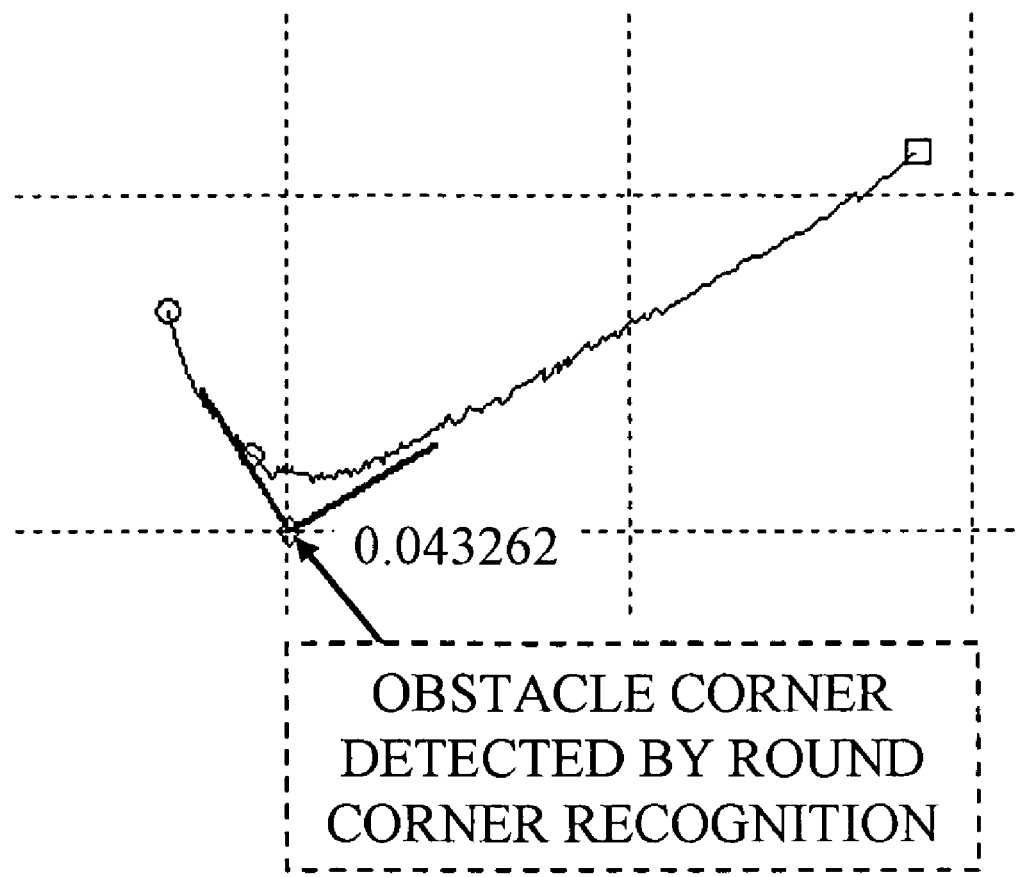
FIG. 16b shows the result of recognizing an obstacle corner by using round corner recognition.

Particularly, FIG. 16a shows the result of recognizing a corner by using rectangular corner recognition with regard to a cluster of the scanning laser radar, and FIG. 16b shows the result of recognizing an obstacle corner by using round corner recognition.

Figure 16C:
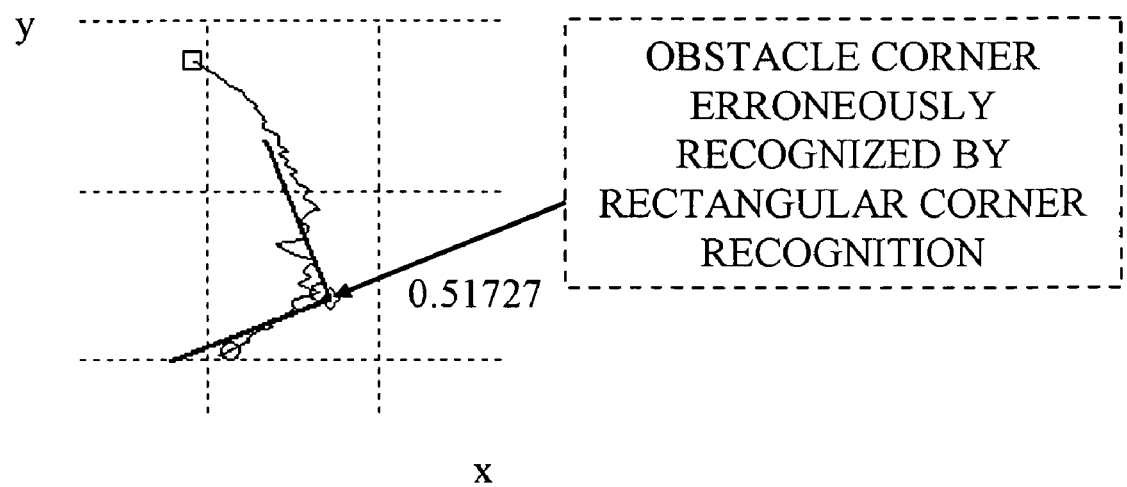
FIG. 16c shows the result of recognizing a corner by using rectangular corner recognition with regard to another cluster of the scanning laser radar.
Figure 16D:
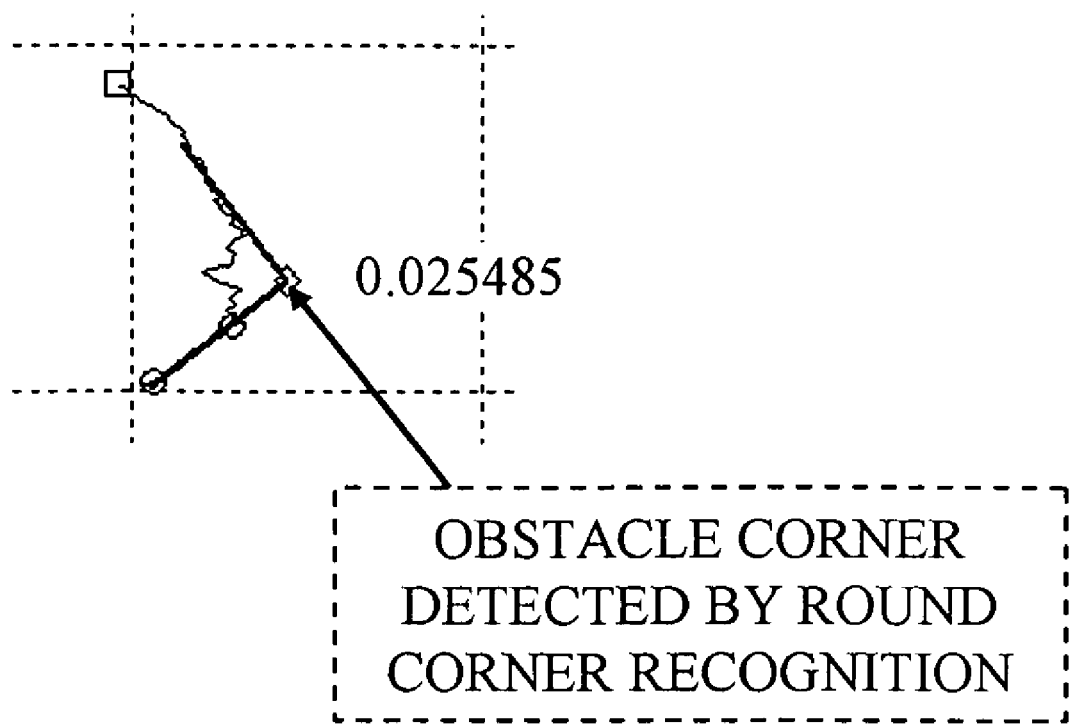
FIG. 16d shows the result of recognizing an obstacle corner by using round corner recognition.

FIG. 16c shows the result of recognizing a corner by using rectangular corner recognition with regard to another cluster of the scanning laser radar, and FIG. 16d shows the result of recognizing an obstacle corner by using round corner recognition.

It is clear that, compared with the rectangular corner recognition result shown in FIG. 16a, the round corner recognition result shown in FIG. 16b has found the end surface of the vehicle more accurately. In addition, the rectangular corner recognition result shown in FIG. 16c has failed to accurately find the direction of the vehicle due to noise of the range data, but the round corner recognition result shown in FIG. 16d has accurately found the direction of the vehicle and the obstacle corner.

The parking location setting unit 108 recognizes a main reference corner and a sub reference corner among obstacle corners to set a target parking location. The main reference corner refers to an obstacle corner which has an adjacent space satisfying an available parking space condition and which is closest to the subjective vehicle. The sub reference corner refers to an obstacle corner which exists toward the adjacent space in a direction opposite to the vehicle width direction from the main reference corner and which corresponds to a point on the closest effective cluster within the distance between the vehicle width and the vehicle length.

Particularly, among obstacle corners within the ROI (Region of Interest) for perpendicular parking, an obstacle corner which satisfies the available parking space condition and which is closest to the subjective vehicle is recognized as the main reference corner, i.e. the reference for setting the target parking location.

It is assumed that inputted range data has been obtained by stopping the subjective vehicle at a location suitable for perpendicular parking. Then, the target parking location must exist within a predetermined FOV (Field of View) of the scanning laser radar mounted on the rear surface of the vehicle, e.g. 160°, and the distance to the subjective vehicle must also lie within a predetermined range. These conditions are set with regard to the ROI, and obstacle corners existing outside the ROI, as well as corresponding clusters, are ignored.

FIG. 17 shows the result of corner recognition and the result of applying the ROI.

Figure 17A:
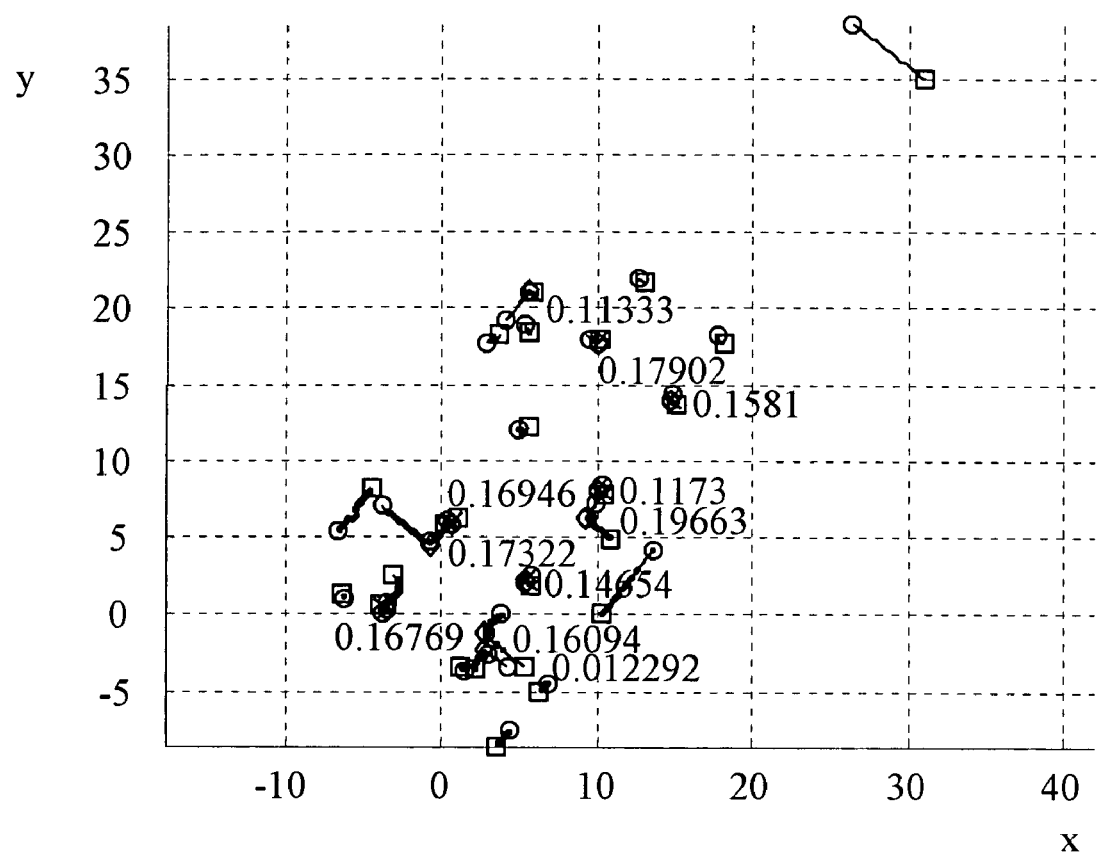
FIG. 17a shows the result of corner recognition, i.e. result of detecting a marked fitting error.
Figure 17B:
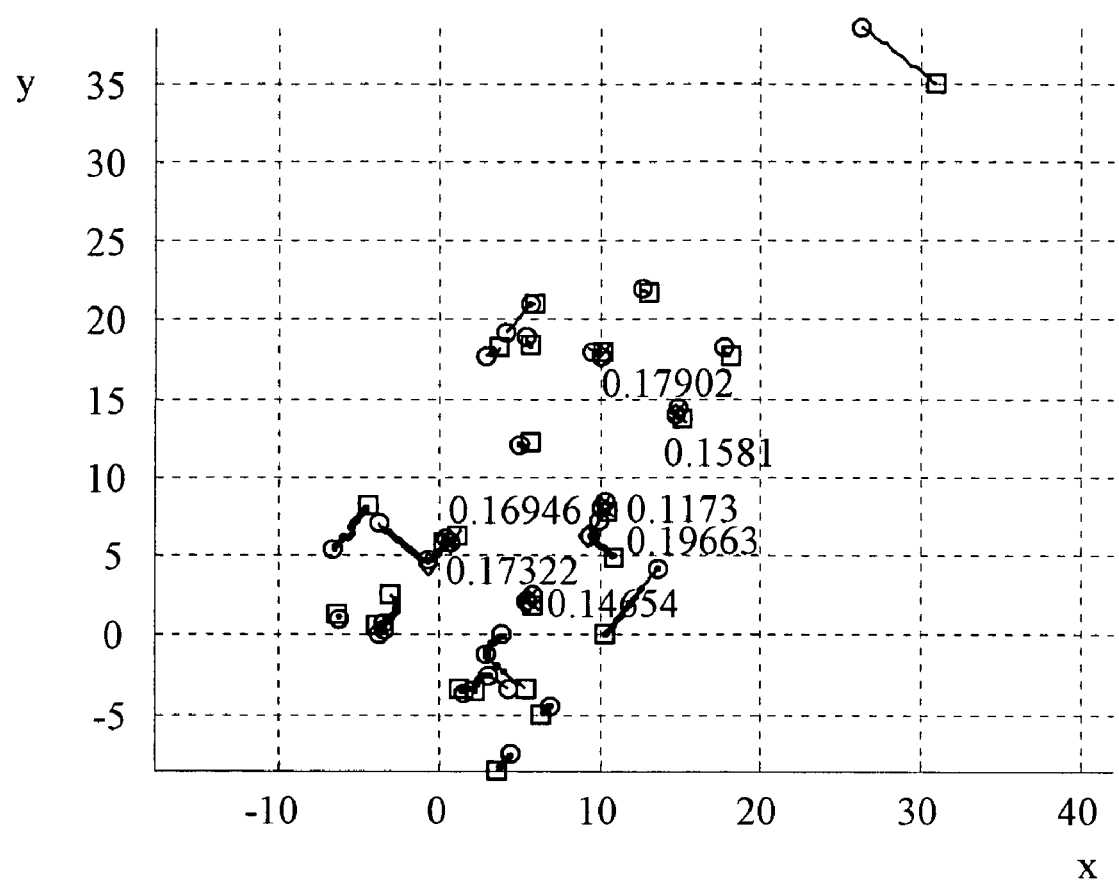

Particularly, FIG. 17a shows the result of corner recognition, i.e. result of detecting a marked fitting error. FIG. 17b shows the result of applying the ROI to the result of corner recognition shown in FIG. 17a. The fitting error value has been omitted from FIG. 17b to indicate that it has been exempted from ROI application.

Reference is made to uniform vectors $d_1$ and $d_2$ parallel with two straight lines, which have been set as a result of corner recognition shown in FIG. 9, to confirm whether or not an obstacle exist in directions opposite to $d_1$ and $d_2$ with regard to obstacle corners within the ROI, i.e. to determine whether or not obstacle corners exist next to an available parking space.

Figure 18:
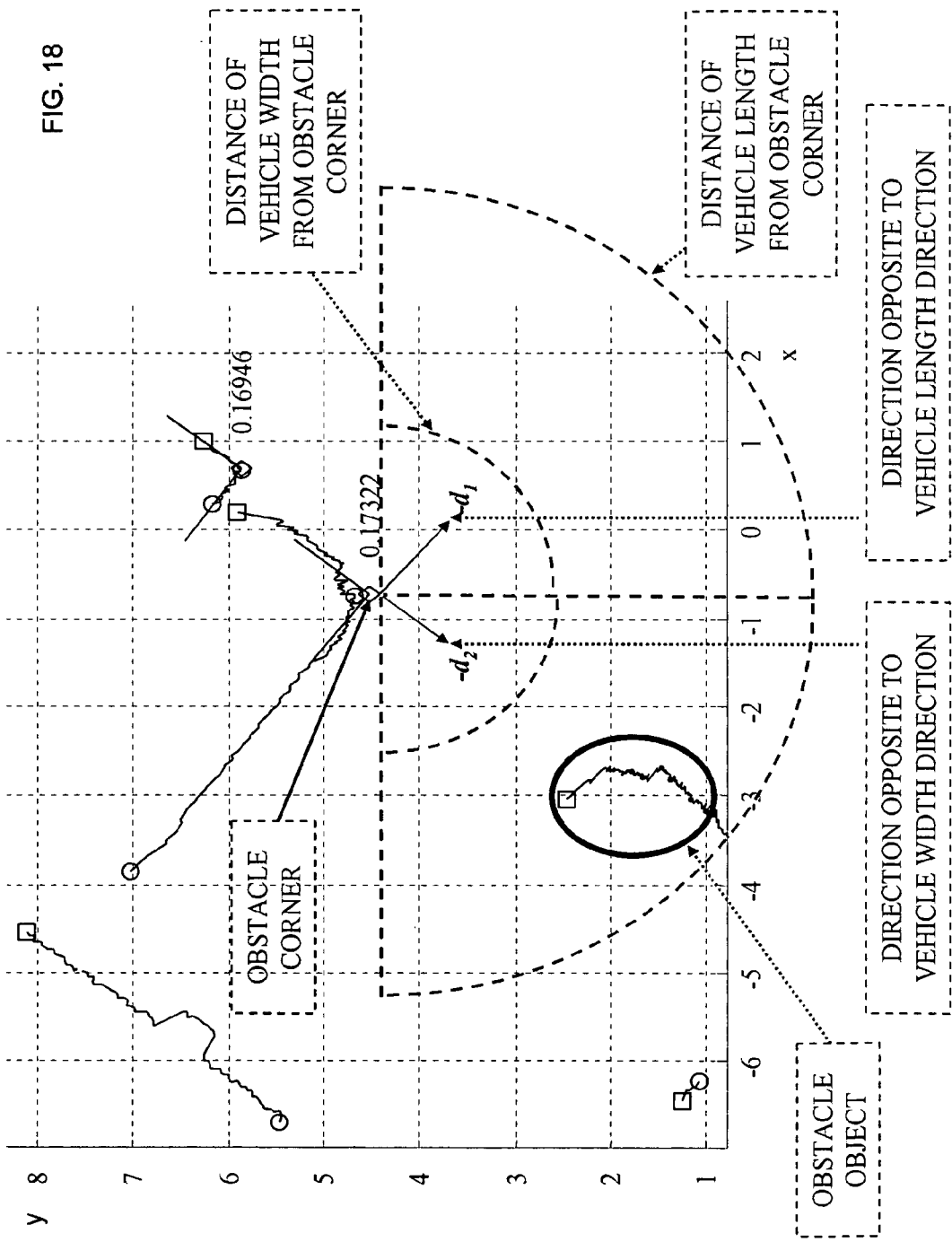
FIG. 18 shows a method for confirming if an available parking space exists near an obstacle corner.

FIG. 18 shows a method for confirming if an available parking space exists near an obstacle corner.

As used herein, an available parking space condition refers to a case in which an obstacle object exists within a distance between the vehicle width and the vehicle length within a predetermined ROI in a direction opposite to the vehicle width direction from the obstacle corner, and in which no obstacle object exists within the distance of the vehicle length within a predetermined ROI in a direction opposite to the vehicle length direction from the obstacle corner.

More particularly, a predetermined ROI in directions opposite to $d_1$ and $d_2$, i.e. FOV range (e.g. 90°), is observed to determine whether or not an obstacle object exists within a distance of the vehicle width and whether or not an obstacle object exists within a distance of the vehicle length. If the corner that is being inspected exists next to an available parking location, an obstacle object is supposed to exist within a distance between the vehicle width and the vehicle length on one side, as shown in FIG. 18, and no obstacle object is supposed to exist within a distance of the vehicle length on the other side. If an obstacle object exists within a distance of the vehicle width in any direction, or if obstacles exist within the vehicle length in both directions, it is determined that the corner does not exist next to an available parking location.

In the case of a rectangular corner during a corner recognition process, $d_1$ and $d_2$ are set in the direction of the long and short axes (length and width of the vehicle), respectively. In the case of a round corner, $d_1$ and $d_2$ are set in the direction of the straight line and the ellipse (length and width of the vehicle), respectively. In the process of checking if an available parking space exists, $d_2$ is modified to indicate the side having an obstacle between the vehicle width and vehicle length, and $d_1$ is modified to indicate the side having no obstacle within the vehicle length. If no obstacle is found within the vehicle length in either direction, the value set in the corner recognition process is retained.

The $d_1$ and $d_2$ set in this manner can be used to determine the location of the target parking location candidate. Only a case in which the entire area of the target parking location exists within the FOV is regarded as valid, and other cases are excluded.

Figure 19:
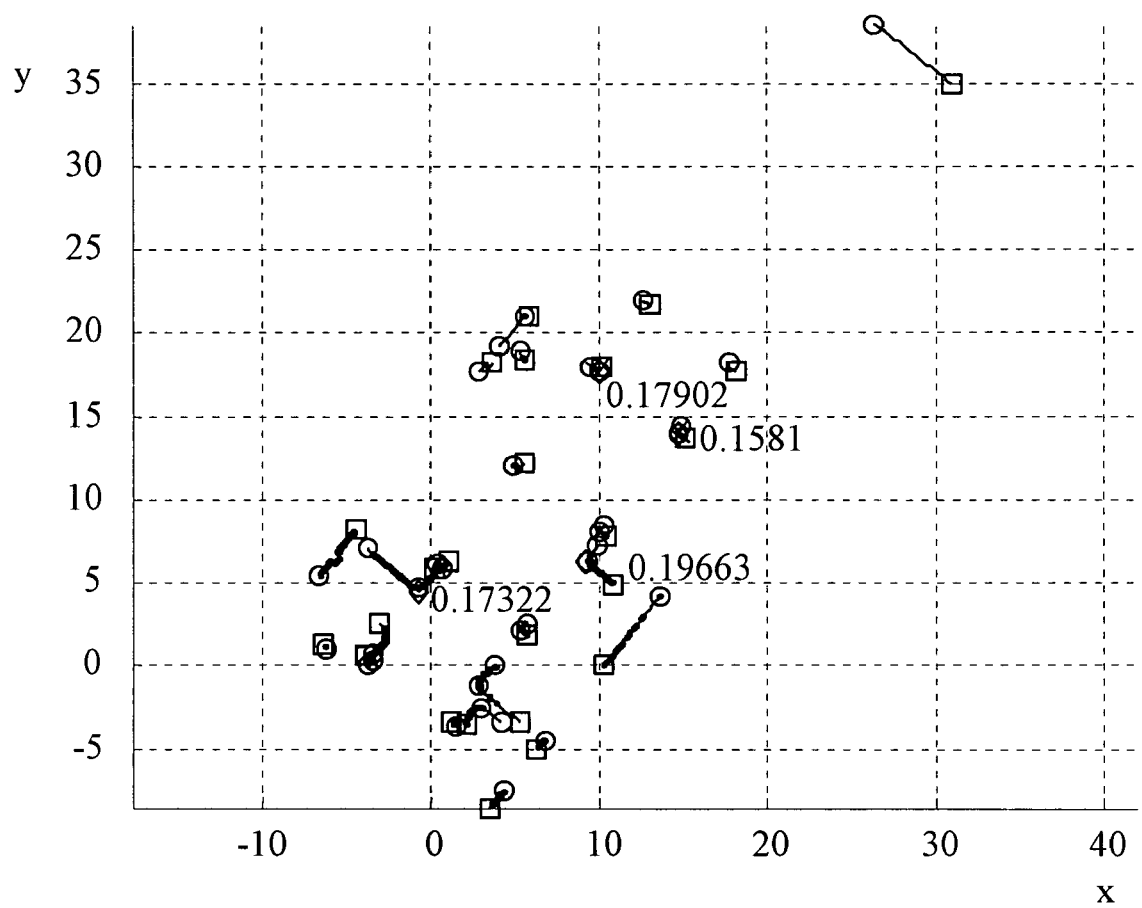
FIG. 19 shows the result of leaving only obstacle corners that satisfy an available parking space condition.

FIG. 19 shows the result of leaving only obstacle corners that satisfy the available parking space condition.

Obstacle corners satisfying the available parking space condition are solely left from obstacle corners obtained from application of the ROI shown in FIG. 17b, and the fitting error values of remaining obstacle corners are deleted. The result is shown in FIG. 19. It is clear from FIG. 19 that not many of the obstacle corners that existed within the ROI satisfy the available parking space condition.

Figure 20:
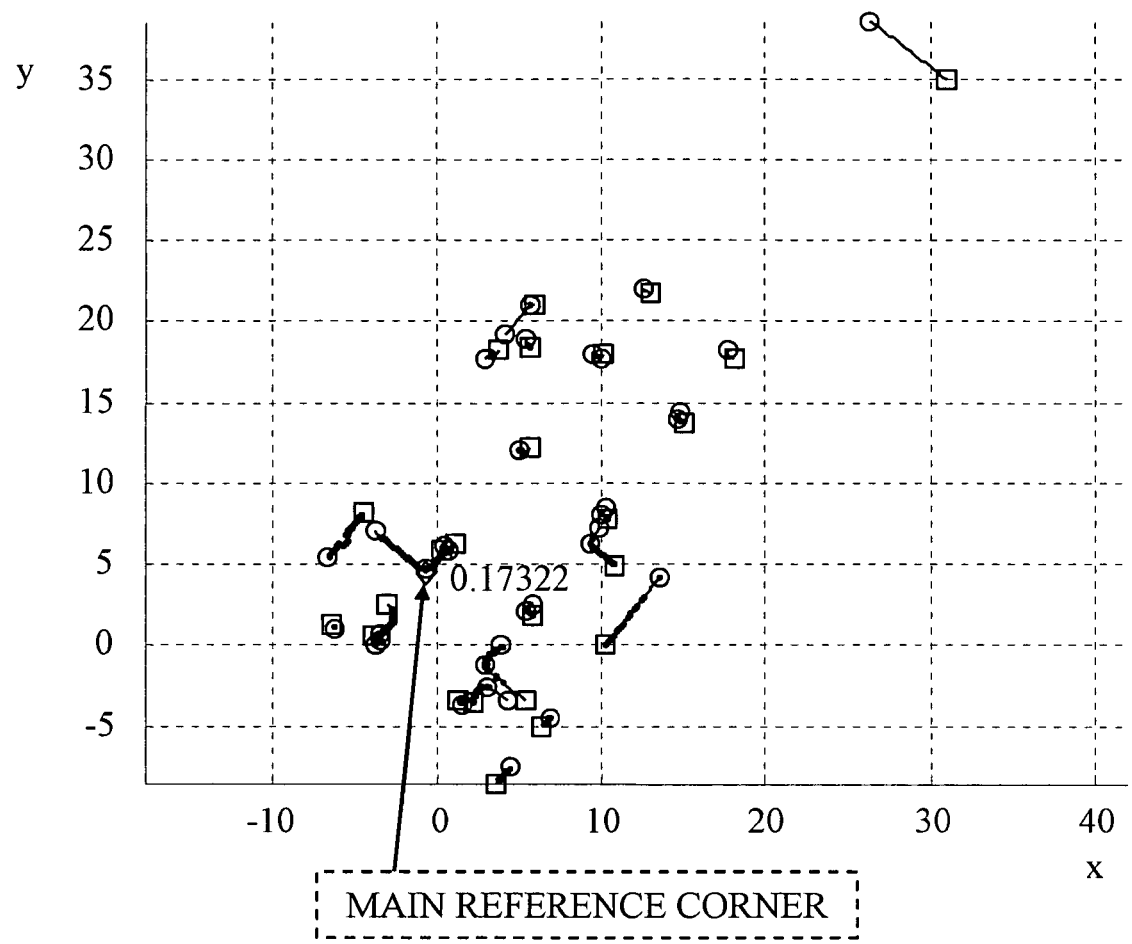
FIG. 20 shows the result of recognizing an obstacle corner closest to the subjective vehicle, among obstacle corners satisfying the available parking space condition, as a main reference corner existing next to the target parking space.

FIG. 20 shows the result of recognizing an obstacle corner closest to the subjective vehicle, among obstacle corners satisfying the available parking space condition, as a main reference corner existing next to the target parking space.

After recognizing the main reference corner, a sub reference corner is recognized. Among occlusions or obstacle corners existing within a predetermined FOV (e.g. 90°) in a direction opposite to $d_2$ of the main reference corner, the closest point is recognized as a sub reference corner.

The target parking location is set in the following manner. The sub reference corner is projected onto a point on a straight line extending from the main reference corner in the vehicle length direction. A line segment is drawn from the point of projection to a point of the main reference corner, which lies toward the outside of the adjacent space, in parallel with the vehicle width direction, and is designated as an outward border. A line segment extending through the center of the designated outward border in parallel with the vehicle length direction is located at the center of the target parking location.

Figure 21:
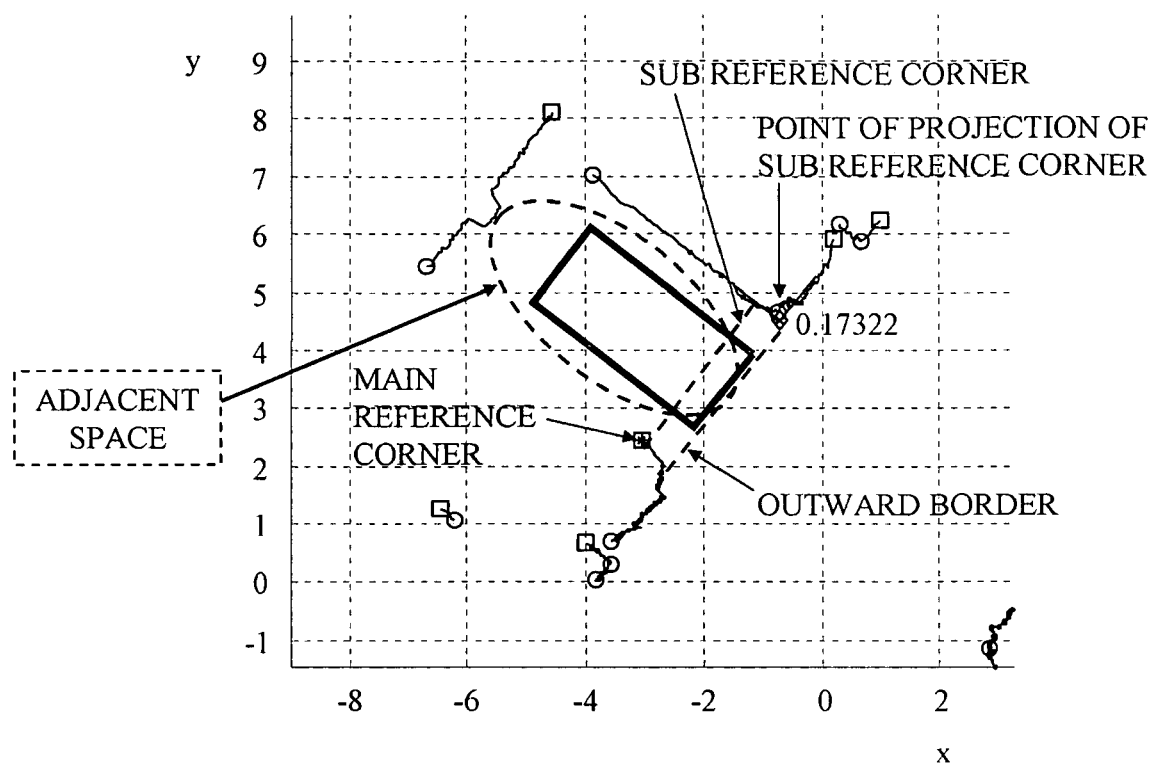
FIG. 21 shows a method for setting a sub reference corner and the outward border of a target parking location.

FIG. 21 shows a method for determining a sub reference corner and the outward border of a target parking location.

Vehicles or building structures on the left and right of an available parking space may have different depths, directions, or locations. To compensate for this difference, the sub reference corner is projected onto a point on a straight line extending along $d_1$, (labeled "POINT OF PROJECTION OF SUB REFERENCE CORNER" In FIG. 21), and is joined by a location on the main reference corner, which lies toward the outside of the adjacent parking space, to set the outward border. FIG. 21 shows the result of recognizing the sub reference corner, as well as the outward border of the target parking location determined with reference to the main reference corner.

Having determined the main reference corner, the sub reference corner, and the outward border, the target parking location can be determined by positioning the width direction center of the target parking location at the center of the outward border. The width and length of the target parking location are determined with reference to the width and length of the subjective vehicle.

Figure 22:
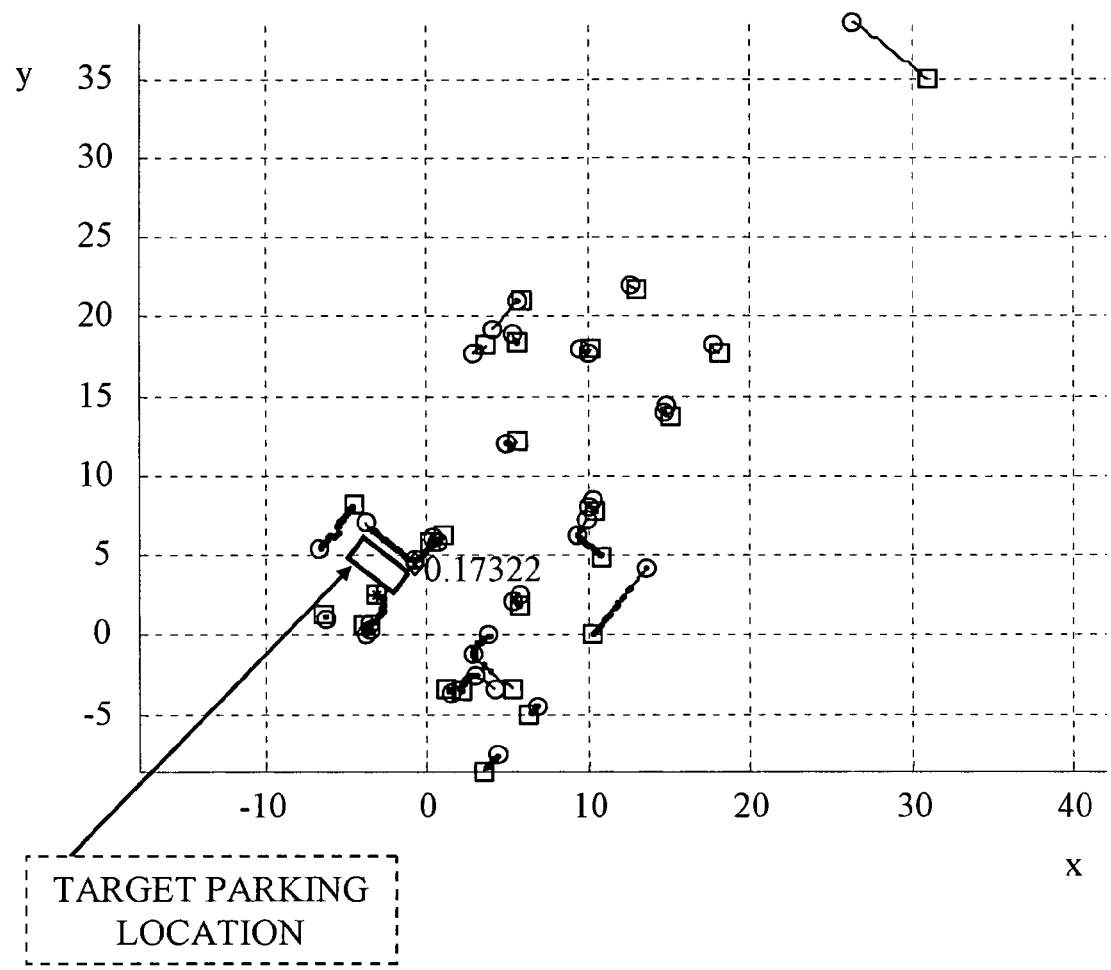
FIG. 22 shows a determined target parking location.

FIG. 22 shows a determined target parking location.

The target parking location has been properly determined as shown in FIG. 22.

Figure 23:
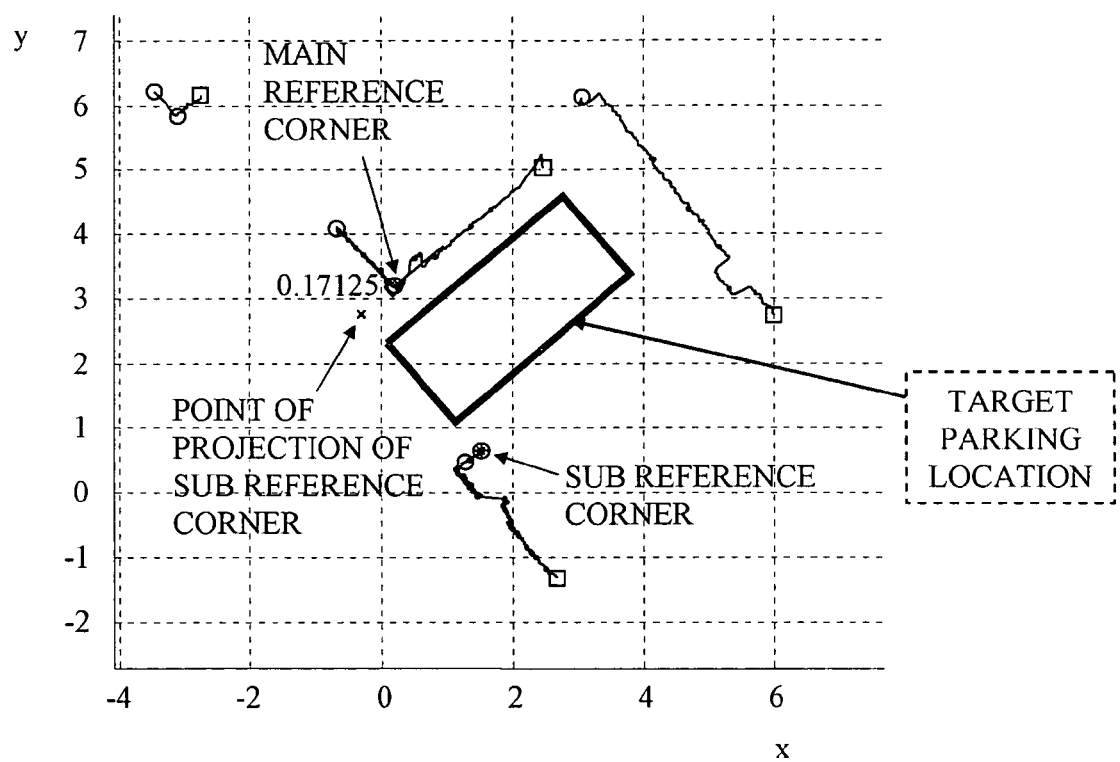
FIG. 23 shows a case of determining the outward border of a target parking location with reference to a point of projection of a sub reference corner.

FIG. 23 shows, a case of determining the outward border of a target parking location with reference to a point of projection of a sub reference corner.

An available parking space exists between a vehicle and a post, as shown in FIG. 23, and the outward border of the target parking location is determined by projection of the sub reference corner. The reason projection of the sub reference corner is considered is that, even if the available parking space is between two objects having different depths, the target parking location can be determined at a suitable depth in parallel with the depth direction of both objects.

It is clear from results of applying the proposed method to 26 cases that the target parking location has been successfully determined in all cases. The range data used for the experiment includes all cases that can hardly be handled by other existing methods (e.g. daytime, nighttime, outdoor, underground, backlight).

Figure 24:
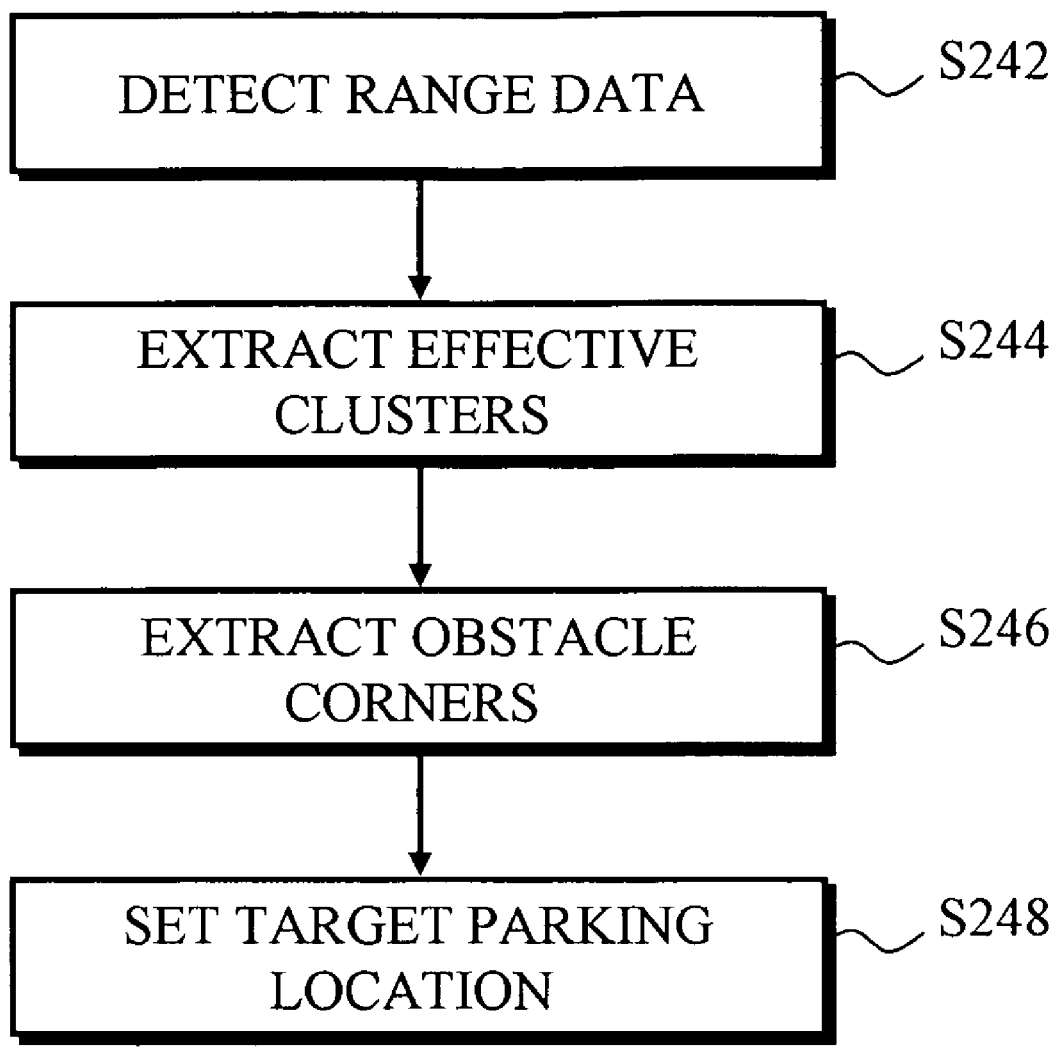
FIG. 24 is a flowchart showing a method for recognizing a target parking location of a vehicle according to an embodiment of the present invention.

FIG. 24 is a flowchart showing a method for recognizing a target parking location of a vehicle according to an embodiment of the present invention.

The method for recognizing a target parking location of a vehicle according to an embodiment of the present invention shown in FIG. 24 employs a system having a scanning laser radar, a preprocessing unit, a corner recognition unit, and a parking location setting unit. The method includes the steps of detecting range data by the scanning laser radar (S242); preprocessing the range data by the preprocessing unit to extract effective clusters (S244); extracting obstacle corners from the effective clusters by the corner recognition unit (S246); and recognizing a main reference corner and a sub reference corner from the obstacle corners by the parking location setting unit to set the target parking location (S248). The main reference corner refers to an obstacle corner which has an adjacent space satisfying the available parking space condition and which is closest to the subjective vehicle. The sub reference corner refers to an obstacle corner which exists toward the adjacent space in a direction opposite to the vehicle width direction from the main reference corner and which corresponds to a point on the closest effective cluster within a distance between the vehicle width and the vehicle length.

The preprocessing may include the steps of removing ineffective data and isolated data from the range data to extract effective range data, recognizing occlusions from the effective range data, and removing small clusters from the effective range data.

As used herein, an obstacle corner refers to the corner of an L-shaped effective cluster, or the corner of an effective cluster having the combined shape of an elliptical arc and a straight line.

The available parking space condition refers to a case in which an obstacle object exists within a distance between the vehicle width and the vehicle length within a predetermined ROI in a direction opposite to the vehicle width direction from the extracted obstacle corner, and in which no obstacle object exists within the distance of the vehicle length within a predetermined ROI in a direction opposite to the vehicle length direction from the obstacle corner.

A sub reference corner may be one of an occlusion and the obstacle corner.

The target parking location is set in the following manner. The sub reference corner is projected onto a point on a straight line extending from the main reference corner in the vehicle length direction. A line segment is drawn from the point of projection to a point of the main reference corner, which lies toward the outside of the adjacent space, in parallel with the vehicle width direction, and is designated as an outward border. A line segment extending through the center of the designated outward border in parallel with the vehicle length direction is located at the center of the target parking location.

As such, the method for recognizing a target parking location of a vehicle according to an embodiment of the present invention is based on the same definitions as the system for recognizing a target parking location of a vehicle described with reference to FIGS. 2-23.

Although an exemplary embodiment of the present invention has been described for illustrative purposes, those skilled in the art will appreciate that various modifications, additions and substitutions are possible, without departing from the scope and of the invention as disclosed in the accompanying claims.

According to the embodiments, a scanning laser radar is mounted on the rear portion of a vehicle to detect range data, which is used to set the target parking location for perpendicular parking. This is advantageous, for example, in that the target parking location can be determined even in cases that can hardly be handled by conventional methods (e.g. daytime, nighttime, outdoor, underground, backlight).

What is claimed is:

1. A system for recognizing a target parking location of a vehicle, the system comprising:
   a scanning laser radar for detecting range data reflected and directed from a rear surface of the vehicle;
   a preprocessing unit for preprocessing the range data to extract effective clusters of the range data by removing clusters of which lengths are less than a threshold, clusters being continuous range data;
   a corner recognition unit for extracting obstacle corners from the effective clusters; and
   a parking location setting unit for recognizing a main reference corner and a sub reference corner from the obstacle corners to set a target parking location, the main reference corner being an obstacle corner closest to a subject vehicle and having an adjacent space satisfying an available parking space condition, the sub reference corner being an obstacle corner existing toward the adjacent space in a direction opposite to a vehicle width direction from the main reference corner and being a point on a closest effective cluster within a distance between a vehicle width and a vehicle length.

2. The system as claimed in claim 1, wherein the obstacle corner is a corner of an L-shaped effective cluster or a corner of an effective cluster having a combined shape of an elliptical arc and a straight line.

3. The system as claimed in claim 1, wherein the available parking space condition is satisfied when an obstacle object exists within a distance between the vehicle width and the vehicle length within a predetermined region of interest in the direction opposite to the vehicle width direction from the obstacle corner, and when no obstacle object exists within the distance of the vehicle length within the predetermined region of interest in a direction opposite to a vehicle length direction from the obstacle corner.

4. The system as claimed in claim 1, wherein the sub reference corner is one of an occlusion and the obstacle corner.

5. The system as claimed in claim 1, wherein the target parking location is set by projecting the sub reference corner onto a point on a straight line extending from the main reference corner in the vehicle length direction, designating a line segment extending from the point of projection to a point of the main reference corner, the point lying toward the outside of the adjacent space, in parallel with the vehicle width direction as an outward border, and locating a line segment extending through the center of the outward border in parallel with the vehicle length direction at the center of the target parking location.

6. A method for recognizing a target parking location of a vehicle by a system having a scanning laser radar, a preprocessing unit, a corner recognition unit, and a parking location setting unit, the method comprising:
  detecting range data by the scanning laser radar;
  preprocessing the range data, by the preprocessing unit, to extract effective clusters of the range data by removing clusters of which lengths are less than a threshold, clusters being continuous range data;
  extracting obstacle corners from the clusters by the corner recognition unit; and
  recognizing a main reference corner and a sub reference corner from the obstacle corners by the parking location setting unit to set a target parking location, the main reference corner being an obstacle corner closest to a subject vehicle and having an adjacent space satisfying an available parking space condition, the sub reference corner being an obstacle corner existing toward the adjacent space in a direction opposite to a vehicle width direction from the main reference corner and being a point on a closest effective cluster within a distance between a vehicle width and a vehicle length.

7. The method as claimed in claim 6, wherein the preprocessing comprises:
  removing ineffective data and isolated data from the range data to extract effective range data;
  recognizing occlusions from the effective range data; and
  removing small clusters from the effective range data.

8. The method claimed in claim 6, wherein the obstacle corner is a corner of an L-shaped effective cluster or a corner of an effective cluster having a combined shape of an elliptical arc and a straight line.

9. The method as claimed in claim 6, wherein the available parking space condition is satisfied when an obstacle object exists within a distance between the vehicle width and the vehicle length within a predetermined region of interest in the direction opposite to the vehicle width direction from the obstacle corner, and when no obstacle object exists within the distance of the vehicle length within the predetermined region of interest in a direction opposite to a vehicle length direction from the obstacle corner.

10. The method as claimed in claim 6, wherein the sub reference corner is one of an occlusion and the obstacle corner.

11. The method as claimed in claim 6, wherein the target parking location is set by projecting the sub reference corner onto a point on a straight line extending from the main reference corner in the vehicle length direction, designating a line segment extending from the point of projection to a point of the main reference corner, the point lying toward the outside of the adjacent space, in parallel with the vehicle width direction as an outward border, and locating a line segment extending through the center of the outward border in parallel with 15 the vehicle length direction at the center of the target parking location.

* * * * *